US010928720B2

(12) United States Patent
Uchida et al.

(10) Patent No.: US 10,928,720 B2
(45) Date of Patent: Feb. 23, 2021

(54) PROJECTION OPTICAL SYSTEM, IMAGE PROJECTION DEVICE AND IMAGE PROJECTION SYSTEM

(71) Applicant: Panasonic Intellectual Property Management Co., Ltd., Osaka (JP)

(72) Inventors: Tsuneo Uchida, Chiba (JP); Katsu Yamada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/577,887

(22) Filed: Sep. 20, 2019

(65) Prior Publication Data

US 2020/0019051 A1 Jan. 16, 2020

Related U.S. Application Data

(63) Continuation of application No. PCT/JP2017/039848, filed on Nov. 6, 2017.

(30) Foreign Application Priority Data

Mar. 30, 2017 (JP) .................... 2017-066967

(51) Int. Cl.
*G03B 21/28* (2006.01)
*G02B 13/18* (2006.01)
*G02B 17/08* (2006.01)

(52) U.S. Cl.
CPC ............ *G03B 21/28* (2013.01); *G02B 13/18* (2013.01); *G02B 17/08* (2013.01)

(58) Field of Classification Search
CPC ........ G02B 13/16; G02B 13/18; G02B 13/22; G02B 13/0045; G02B 13/0065;
(Continued)

(56) References Cited

U.S. PATENT DOCUMENTS

2003/0202161 A1* 10/2003 Konno ............... G02B 17/0663
353/70
2004/0156117 A1* 8/2004 Takaura ............. G02B 17/0852
359/651
(Continued)

FOREIGN PATENT DOCUMENTS

EP 3343264 A1 7/2018
JP 2009-157223 7/2009
(Continued)

OTHER PUBLICATIONS

The Extended European Search Report dated Feb. 14, 2020 for the related European Patent Application No. 17902636.4.
(Continued)

*Primary Examiner* — Sultan Chowdhury
(74) *Attorney, Agent, or Firm* — McDermott Will and Emery LLP

(57) ABSTRACT

A projection optical system is a projection optical system for projecting an image in an image display element on a projection target surface in an enlarged manner, and includes a transmissive optical system and a reflection optical system. The transmissive optical system includes a plurality of lenses and an aperture diaphragm. The reflection optical system includes a first reflecting surface that reflects light emitted from the transmissive optical system and a second reflecting surface that reflects light emitted from the first reflecting surface. A principal ray of the reference rays is a ray passing through a center of the aperture diaphragm among the reference rays. Local power of the first reflecting surface at a position where the principal ray enters the first reflecting surface is larger than local power of the second reflecting surface at a position where the principal ray enters the second reflecting surface.

20 Claims, 10 Drawing Sheets

(58) Field of Classification Search
CPC .... G02B 17/08; G02B 17/0804; G02B 17/0828;
G02B 17/0856; G02B 17/0848; G02B
17/0896; G03B 21/006; G03B 21/008;
G03B 21/28; G03B 21/56; G03B 21/142;
G03B 21/2066

See application file for complete search history.

(56) References Cited

U.S. PATENT DOCUMENTS

| | | | | |
|---|---|---|---|---|
| 2004/0233405 | A1* | 11/2004 | Kato | G03F 7/70275 |
| | | | | 355/53 |
| 2006/0176579 | A1* | 8/2006 | Kuwa | G02B 17/0832 |
| | | | | 359/727 |
| 2009/0168031 | A1 | 7/2009 | Imaoka et al. | |
| 2009/0213470 | A1 | 8/2009 | Abe et al. | |
| 2014/0218702 | A1 | 8/2014 | Yasui et al. | |
| 2015/0205099 | A1* | 7/2015 | Arai | G03B 21/28 |
| | | | | 353/98 |
| 2016/0238825 | A1* | 8/2016 | Minefuji | G02B 1/041 |
| 2017/0227744 | A1* | 8/2017 | Sakata | G02B 13/16 |

FOREIGN PATENT DOCUMENTS

| | | |
|---|---|---|
| JP | 2009-204846 | 9/2009 |
| JP | 2012-168482 | 9/2012 |
| JP | 2013-174886 | 9/2013 |
| JP | 2014-153478 | 8/2014 |
| JP | 2014-235414 | 12/2014 |

OTHER PUBLICATIONS

International Search Report of PCT application No. PCT/JP2017/039848 dated Jan. 30, 2018.

* cited by examiner

PROJECTION OPTICAL SYSTEM, IMAGE PROJECTION DEVICE AND IMAGE PROJECTION SYSTEM

TECHNICAL FIELD

The present disclosure relates to a projection optical system for projecting an image generated by an image display element.

BACKGROUND ART

PTL 1 discloses a projection device configured by using a projection optical system including a reflecting surface. The projection optical system is a projection optical system for projecting an image formed in a light valve on a projection surface in an enlarged manner, and includes a lens optical system, a first reflecting surface, and a second reflecting surface. The lens optical system is configured with a plurality of lenses, and has positive power to form an intermediate image of the image between the projection surface and the light valve. The first reflecting surface has positive power for reflecting a diverging light flux after formation of the intermediate image to form an image on the projection surface. The second reflecting surface causes light emitted from the lens optical system to enter the first reflecting surface. This configuration enables projection of a large-sized image reduced in chromatic aberration and distortion.

However, the projection device disclosed in PTL 1 needs a long distance from the first reflecting surface to the second reflecting surface. As a result, the projection device needs to be large (tall in height).

CITATION LIST

Patent Literature

PTL 1: Unexamined Japanese Patent Publication No. 2013-174886

SUMMARY

The present disclosure provides a projection optical system capable of reducing image distortion while being small in size.

The projection optical system according to the present disclosure is a projection optical system for projecting an image in an image display element on a projection target surface in an enlarged manner, and includes a transmissive optical system and a reflection optical system. The transmissive optical system includes a plurality of lenses and an aperture diaphragm. The reflection optical system includes a first reflecting surface that reflects light emitted from the transmissive optical system, and a second reflecting surface that reflects light emitted from the first reflecting surface. The projection target surface is not parallel to a display surface of the image display element. Reference rays are rays projected on a position closest to the projection optical system in the image projected on the projection target surface. A principal ray of the reference rays is a ray passing through a center of the aperture diaphragm among the reference rays. Local power of the first reflecting surface at a position where the principal ray of the reference rays enters the first reflecting surface is larger than local power of the second reflecting surface at a position where the principal ray of the reference rays enters the second reflecting surface.

The projection optical system satisfies the following conditional expressions (1) and (2).

$$1.0 < \theta scn/\theta m2 < 50.0 \quad (1)$$

$$3.0 < D1/D2 < 15.0 \quad (2)$$

Here, $\theta scn$ is an angle formed by a normal line of the projection target surface at a position where the principal ray of the reference rays enters the projection target surface, and the principal ray of the reference rays. $\theta m2$ is an angle formed by a normal line of the second reflecting surface at a position where the principal ray of the reference rays enters the second reflecting surface, and the principal ray of the reference rays. D1 is an optical path length of the principal ray of the reference rays from a display surface of the image display element to the first reflecting surface. D2 is an optical path length of the principal ray of the reference rays from the first reflecting surface to the second reflecting surface.

According to a projection optical system of the present disclosure, an image projection device can be reduced in size, and image distortion can also be reduced.

DESCRIPTION OF EMBODIMENT

Hereinafter, an exemplary embodiment will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and to thus help those skilled in the art to easily understand the description.

It should be noted that the accompanying drawings and the following description are provided to help those skilled in the art fully understand the present disclosure and not intended to limit subject matters as described in the claims.

Exemplary Embodiment

Hereinafter, image projection system 1 and image projection device 10 according to the present disclosure will be described with reference to FIG. 1 to FIG. 10.

Figure 1:
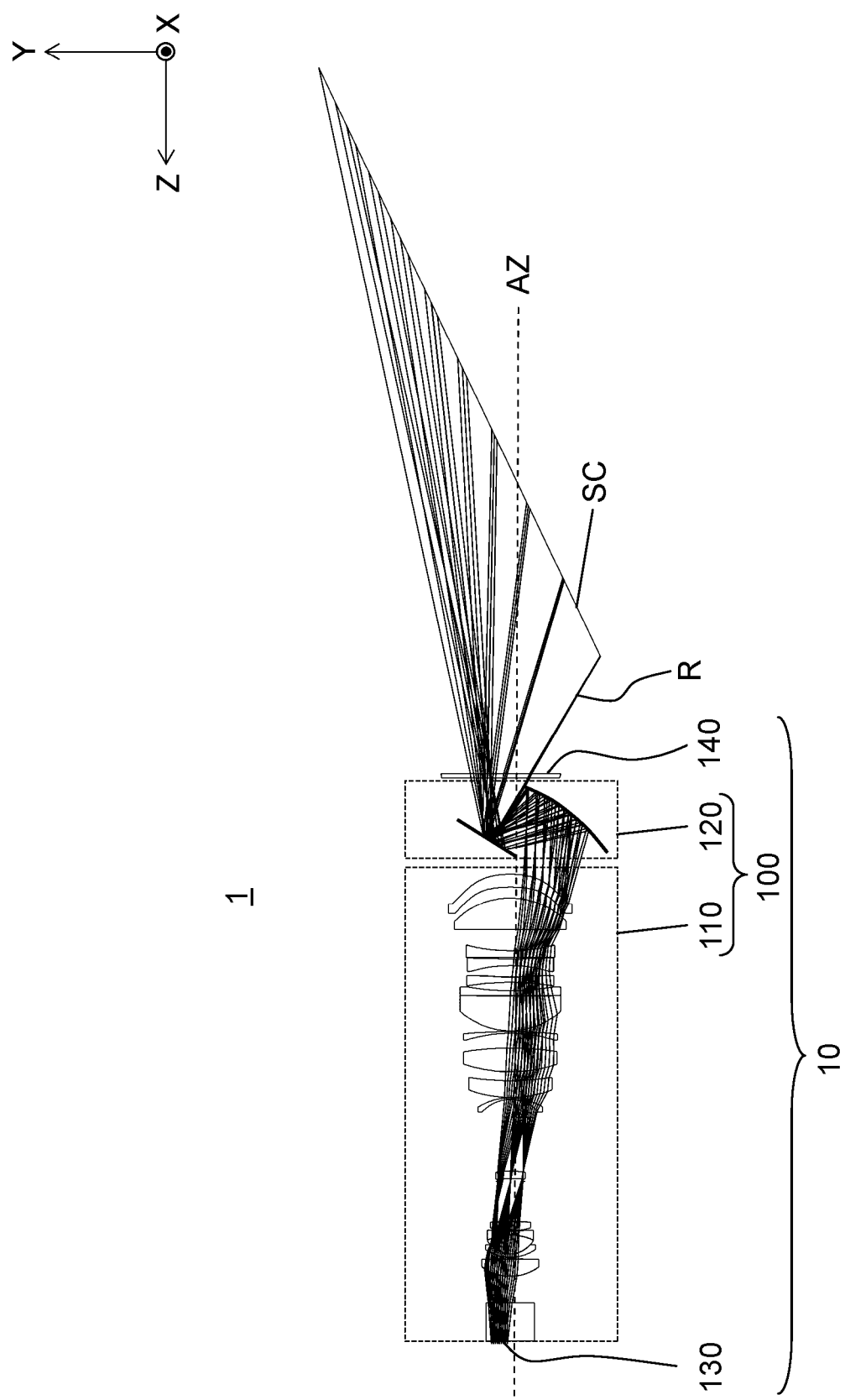
FIG. 1 is a configuration view for describing an image projection system according to the present disclosure.

FIG. 1 is a configuration view for describing image projection system 1 according to the present exemplary embodiment. Image projection system 1 includes image projection device 10 and screen SC (an example of a projection target surface). Image projection device 10 is configured with projection optical system 100, image display element 130, and transmissive element 140. Projection optical system 100 includes transmissive optical system 110 and reflection optical system 120. Image projection device 10 projects an image on screen SC such as a ceiling. For example, image projection device 10 is installed inside a building or a vehicle having an interior wall. Image projection device 10 according to the present exemplary embodiment projects an image on screen SC with a curvature. In addition, image projection device 10 projects an image formed with image display element 130 on screen SC provided in a direction not correctly facing image projection device 10 (diagonal direction).

Herein, screen SC provided in the direction not correctly facing image projection device 10 means a case in which a direction of a normal line at a point where reference rays R reach on screen SC does not coincide with a direction of an optical path of a principal ray of reference rays R emitted from a final surface of projection optical system 100. In other words, screen SC is disposed so as not to be parallel to a display surface of image display element 130.

Herein, reference rays R will be described below. Reference rays R are rays projected on a position closest to projection optical system 100 in a region where rays emitted from image display element 130 are projected on screen SC. When image display element 130 does not use its lower portion in a short side as an image display region, reference rays R are rays in which an image formed with an effective region of image display element 130 is projected at a portion closest to projection optical system 100 on screen SC.

Note that, in image projection device 10 according to the present disclosure, optical axis AZ is defined by a line connecting a center of aperture diaphragm A of transmissive optical system 110, an axis of rotational symmetry of lens elements disposed closer to image display element 130 than aperture diaphragm A is, and an axis of rotational symmetry of lens elements disposed closer to reflection optical system 120 than aperture diaphragm A is. However, optical axis AZ may be an axis that concurrently includes the most lens centers. Alternatively, optical axis AZ may be set at an eccentric position relative to image display element 130 in a plane including the optical path of the emitted light. Herein, the optical path of the emitted light means an optical path of the principal ray passing from a center of image display element 130 to a center of an enlarged image on screen SC among optical paths extending from image display element 130 to screen SC.

When image projection device 10 includes a reflecting surface such as a prism or a mirror in transmissive optical system 110, optical axis AZ may be set as an extended line of an optical axis of an optical system after the optical axis is reflected and bent by the reflecting surface.

Figure 2:
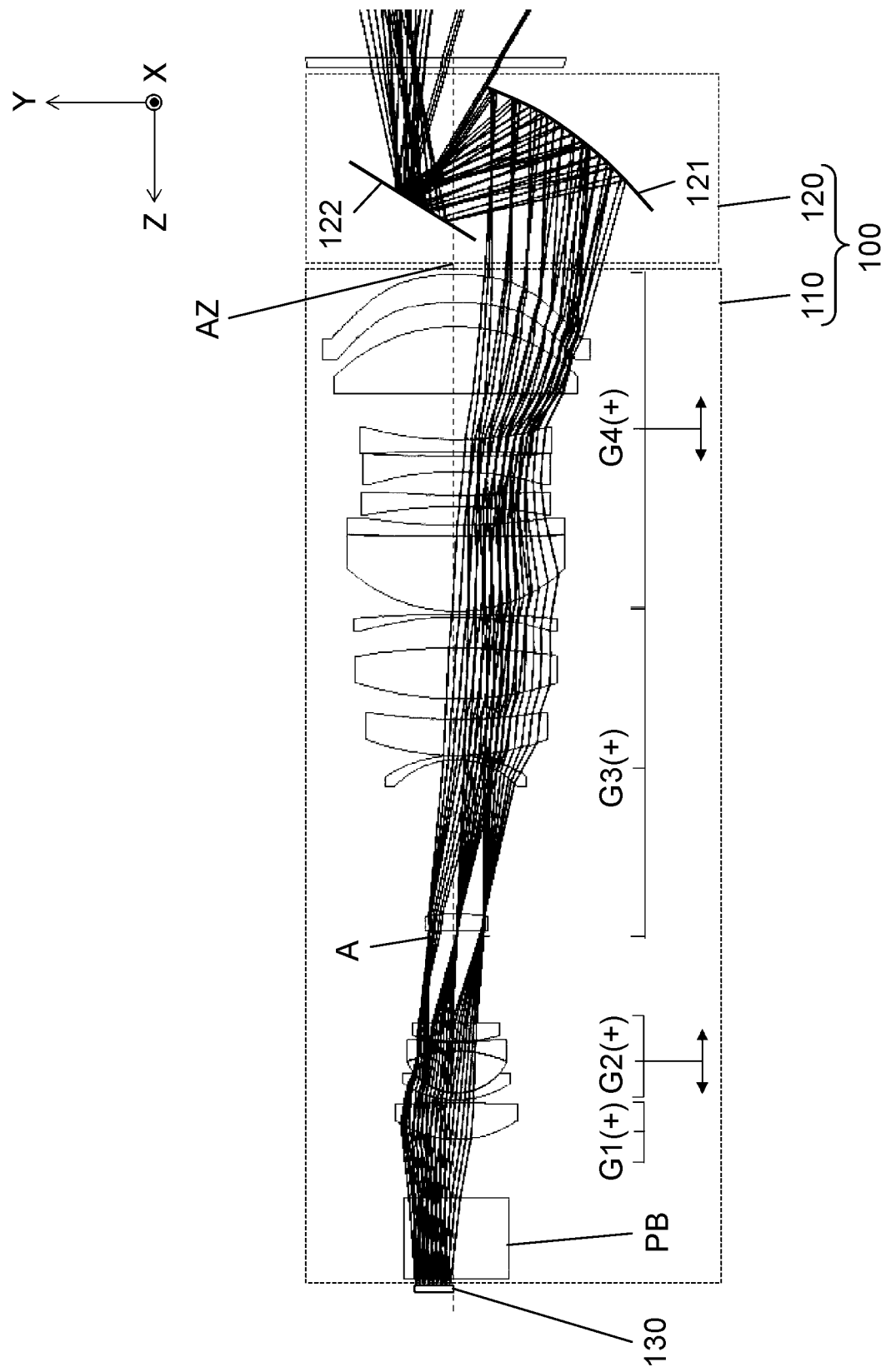
FIG. 2 is a configuration view for describing an image projection device according to the present disclosure.

FIG. 2 is a configuration view for describing image projection device 10 according to the present disclosure. As illustrated in FIG. 2, projection optical system 100 includes transmissive optical system 110 having positive power as a whole, and reflection optical system 120 having positive power as a whole.

Figure 3:
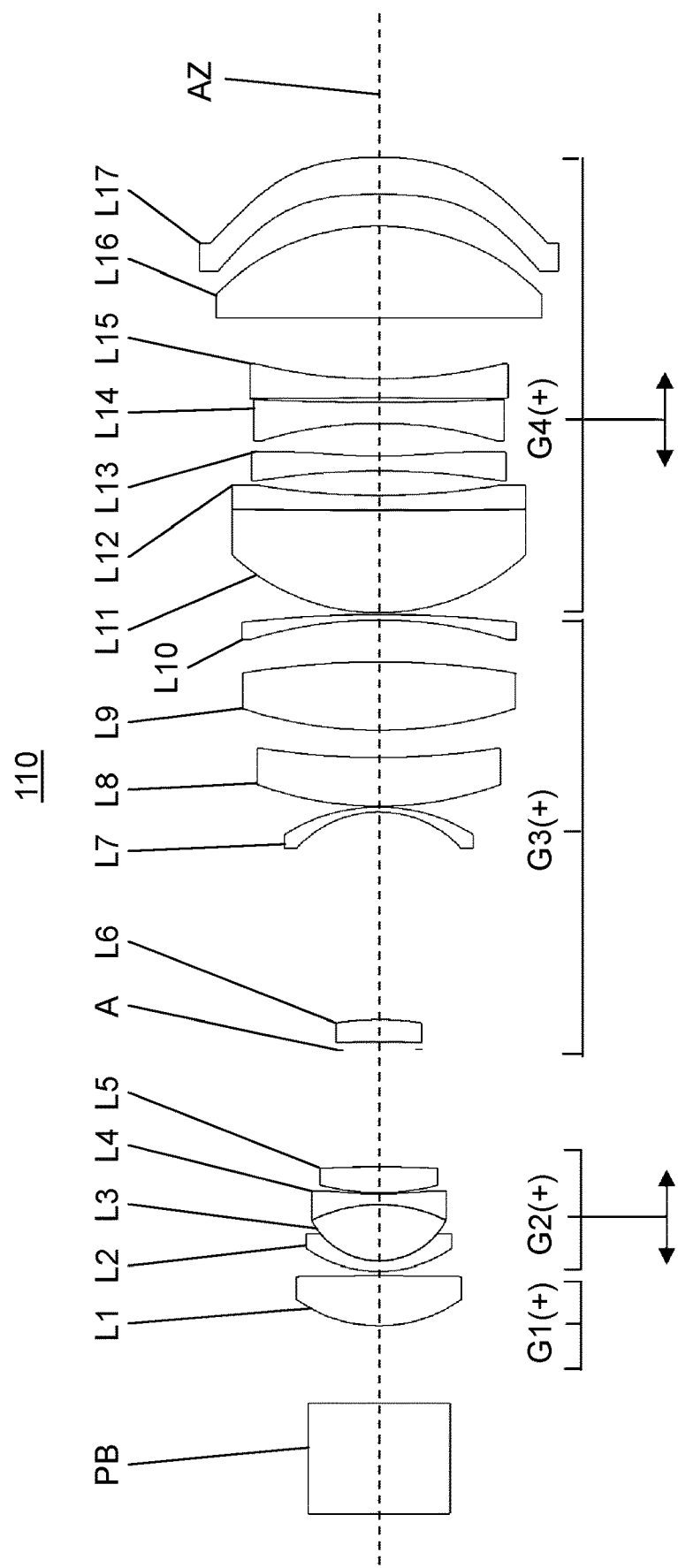
FIG. 3 is a configuration view for describing a transmissive optical system of a projection optical system according to the present disclosure.

With reference to FIG. 2 and FIG. 3, a configuration of transmissive optical system 110 according to the present exemplary embodiment will be described below. Transmissive optical system 110 is configured with first lens group G1 having positive power, second lens group G2 having positive power, third lens group G3 having positive power, fourth lens group G4 having positive power, and prism PB in order from image display element 130 to screen SC. Prism PB is disposed between image display element 130 and first lens group G1.

First lens group G1 is configured with first lens element L1 that is one biconvex lens having an axis of rotational symmetry. First lens element L1 has an aspherical shape.

Second lens group G2 includes second lens element L2, third lens element L3, fourth lens element L4, and fifth lens element L5. Second lens element L2, third lens element L3, fourth lens element L4, and fifth lens element L5 are disposed in order from image display element 130 to reflection optical system 120.

Second lens element L2 has an axis of rotational symmetry, and has a negative meniscus shape. A convex surface of second lens element L2 is directed toward image display element 130. Third lens element L3 has an axis of rotational symmetry, and has a biconvex shape. Fourth lens element L4 has an axis of rotational symmetry, and has a biconcave shape. Fifth lens element L5 has an axis of rotational symmetry, and has a biconvex shape. Second lens element L2, third lens element L3, and fourth lens element L4 are bonded to each other. In second lens element L2, third lens element L3, and fourth lens element L4, optical performance (particularly, field curvature and coma aberration) is remarkably deteriorated due to an error in lens interval. Therefore, second lens element L2, third lens element L3, and fourth lens element L4 bonded to each other can reduce the error in interval.

Herein, third lens element L3 may be a lens formed from low dispersion glass. Alternatively, third lens element L3 may have the strongest positive power among lens elements L1 to L17. Alternatively, both sides of third lens element L3 may not be bonded to lenses having negative power (second lens element L2 and fourth lens element L4). In other words, third lens element L3 may be bonded only to second lens element L2, or may be bonded only to fourth lens element L4.

Third lens group G3 includes aperture diaphragm A, and has positive power as a whole. Third lens group G3 further includes sixth lens element L6, seventh lens element L7, eighth lens element L8, ninth lens element L9, and tenth lens element L10. Sixth lens element L6, seventh lens element L7, eighth lens element L8, ninth lens element L9, and tenth lens element L10 are disposed in order from aperture diaphragm A to reflection optical system 120.

Sixth lens element L6 has an axis of rotational symmetry, and has a positive meniscus shape. A convex surface of sixth lens element L6 is directed toward reflection optical system 120. Seventh lens element L7 has an axis of rotational symmetry, and has a negative meniscus shape. A convex surface of seventh lens element L7 is directed toward screen SC. Eighth lens element L8 has an axis of rotational symmetry, and has a positive meniscus shape. A convex surface of eighth lens element L8 is directed toward image display element 130. Ninth lens element L9 has an axis of rotational symmetry, and has a biconvex shape. Tenth lens element L10 has an axis of rotational symmetry, and has a negative meniscus shape. A convex surface of tenth lens element L10 is directed toward reflection optical system 120.

As illustrated in FIG. 2 and FIG. 3, image display element 130, aperture diaphragm A, seventh lens element L7 (negative meniscus lens), and ninth lens element L9 (biconvex lens) are disposed in this order along optical axis AZ of transmissive optical system 110.

Fourth lens group G4 is disposed to be closest to screen SC among the lens groups in transmissive optical system 110. Fourth lens group G4 includes eleventh lens element L11, twelfth lens element L12, thirteenth lens element L13, fourteenth lens element L14, fifteenth lens element L15, sixteenth lens element L16, and seventeenth lens element L17. Eleventh lens element L11, twelfth lens element L12, thirteenth lens element L13, fourteenth lens element L14, fifteenth lens element L15, sixteenth lens element L16, and seventeenth lens element L17 are disposed in order from image display element 130 to screen SC.

Eleventh lens element L11 has an axis of rotational symmetry, and has positive power. A convex surface of eleventh lens element L11 is directed toward image display element 130. Twelfth lens element L12 has an axis of rotational symmetry, and has negative power. A concave surface of twelfth lens element L12 is directed toward reflection optical system 120. Thirteenth lens element L13 has an axis of rotational symmetry, and has a biconcave shape. Fourteenth lens element L14 has an axis of rotational symmetry, and has a biconcave shape. Fifteenth lens element L15 has an axis of rotational symmetry, and has negative power. A concave surface of fifteenth lens element L15 is directed toward reflection optical system 120. Sixteenth lens element L16 has an axis of rotational symmetry, and has positive power. A convex surface of the sixteenth lens element is directed toward reflection optical system 120. Seventeenth lens element L17 has an axis of rotational symmetry, and has a positive meniscus shape. A convex surface of seventeenth lens element L17 is directed toward reflection optical system 120.

As illustrated in FIG. 1 and FIG. 3, seventeenth lens element L17 (positive meniscus lens) is disposed to be closest to screen SC among lens elements L to L17.

Eleventh lens element L11 and twelfth lens element L12 are bonded to each other. Each of thirteenth lens element L13 and seventeenth lens element L17 is a lens element having an aspherical shape.

Some of lens elements configuring fourth lens group G4 each have a biconcave shape. At least one surface of each lens element having the biconcave shape preferably has an aspherical shape. Specifically, this aspherical shape is a shape whose curvature decreases as it goes away from a center of the lens in a radial direction. In other words, this aspherical shape is a shape whose power is smaller on an outer side of the lens than on a center side of the lens.

Note that, in projection optical system 100, second lens group G2 and fourth lens group G4 move along optical axis AZ upon focusing. Fourth lens group G4 includes at least one surface having the aspherical shape to reduce image distortion produced upon focusing or deterioration in resolution. This configuration can achieve good optical performance even when a projection distance is changed.

Projection optical system 100 further includes a focusing group. This focusing group is configured with at least some lens elements located closer to reflection optical system 120 than aperture diaphragm A is, and moves along optical axis AZ upon focusing. This configuration can reduce image distortion produced upon focusing or deterioration in resolution, and can achieve good optical performance even when the projection distance is changed.

In image projection device 10 according to the present exemplary embodiment, a plurality of lens elements configuring transmissive optical system 110 can partly be cut. Specifically, a region through which rays do not pass in each lens element can be cut. With this configuration, an effect for height reduction of transmissive optical system 110 can be expected. Particularly, lens elements apart from aperture diaphragm A, e.g., lens elements disposed on a contraction side and lens elements disposed on a magnification side, are partly cut, whereby the effect for height reduction can further be expected. Note that lens elements having been cut do not each have the axis of rotational symmetry.

An intermediate image is formed between transmissive optical system 110 and screen SC. This configuration enables adoption of a concave mirror as a part of reflection optical system 120, thereby achieving an advantageous configuration for expansion of a projection region and downsizing of reflection optical system 120. Furthermore, intermediate image formation by transmissive optical system 110 has a feature in which an image formation point by a ray passing closest to optical axis AZ is formed at a position farthest from transmissive optical system 110. The intermediate image formation is desirably formed at a position not straddling reflecting surfaces of reflection optical system 120.

Reflection optical system 120 reflects a light flux emitted from transmissive optical system 110, and projects the reflected light flux on screen SC. Reflection optical system 120 is configured with two mirrors that are first mirror 121 (an example of a first reflecting surface) and second mirror 122 (an example of a second reflecting surface). A reflecting surface of first mirror 121 has a free curved surface shape being concave. First mirror 121 has positive power as a whole. Second mirror 122 is configured with a flat mirror. Note that reflection optical system 120 only has to include one or more mirrors, and is not limited to include two mirrors. Second mirror 122 is disposed closer to screen SC than transmissive optical system 110 is.

Alternatively, reflection optical system 120 may be implemented with one prism element, instead of first mirror 121 and second mirror 122. In this case, incident rays are totally reflected inside the prism element and then emitted. The total reflection surface only has to have the same shape as first mirror 121 and second mirror 122.

Image display element 130 forms an image to be projected on screen SC based on an image signal. As image display element 130, a digital micromirror device (DMD) or a spatial modulation element such as a transmissive type or a reflective type liquid crystal panel can be used. Image display element 130 according to the present disclosure is a rectangle whose long side extends along an X-axis direction in FIG. 2 (a direction perpendicular to the paper plane) and whose short side extends along a Y-axis direction.

Transmissive element 140 is disposed between reflection optical system 120 and screen SC. The light flux reflected by reflection optical system 120 is transmitted through transmissive element 140 to be projected on screen SC. A shape of transmissive element 140 is a toroidal shape in which a curvature in a direction corresponding to a long-side direction of image display element 130 is different from a curvature in a direction corresponding to a short-side direction of image display element 130. A convex surface of transmissive element 140 is directed toward screen SC. In other words, on an incident surface of transmissive element 140, a curvature in the X-axis direction (the direction perpendicular to the paper plane in FIG. 2) corresponding to the long-side direction of image display element 130 is larger than a curvature in the Y-axis direction corresponding to the short-side direction of image display element 130.

In reflection optical system 120, first mirror 121 disposed closer to image display element 130 preferably has a free curved surface shape. First mirror 121 having positive power and having the free curved surface shape can correct image distortion, and at the same time, reduce a height of the ray entering second mirror 122. Therefore, this configuration is advantageous to achieve downsizing.

A distance from seventeenth lens element L17 disposed to be closest to screen SC to first mirror 121 having a reflecting surface that is a free curved surface is longer than a distance from first mirror 121 to second mirror 122. This configuration can reduce an interval between first mirror 121 and second mirror 122, whereby height reduction of projection optical system 100 in the Y-axis direction can be achieved.

Hereinafter, preferable conditions to be satisfied by the projection optical system according to the exemplary embodiment will be described below. Note that a plurality of conditions are defined for the projection optical system according to the exemplary embodiment. A configuration of the projection optical system that satisfies all those conditions is most preferable. However, by satisfying an individual condition, a projection optical system exhibiting an effect corresponding to this condition can be obtained.

Projection optical system 100 according to the present exemplary embodiment is a projection optical system for projecting an image in image display element 130 on screen SC in an enlarged manner, and includes transmissive optical system 110 and reflection optical system 120. Transmissive optical system 110 includes a plurality of lenses (lens elements L1 to L17) and aperture diaphragm A. Reflection optical system 120 includes first mirror 121 that reflects light emitted from transmissive optical system 110, and second mirror 122 that reflects the light emitted from first mirror 121. Reference rays R are rays projected on a position closest to projection optical system 100 in the image projected on screen SC. A principal ray of reference rays R is a ray passing through a center of aperture diaphragm A among reference rays. Local power of first mirror 121 at a position where the principal ray of reference rays R enters first mirror 121 is stronger than local power of second mirror 122 where the principal ray of reference rays R enters second mirror 122. Hereinafter, this configuration is referred to as a basic configuration of the exemplary embodiment.

Projection optical system 100 preferably satisfies the following conditional expression (1).

$$1.0 < \theta scn/\theta m2 < 50.0 \quad (1)$$

Here, θscn is an angle formed by a normal line of screen SC at a position where the principal ray of reference rays R enters screen SC, and the principal ray of reference rays R. θm2 is an angle formed by a normal line of second mirror 122 at a position where the principal ray of reference rays R enters second mirror 122, and the principal ray of reference rays R.

Note that, in the present disclosure, angle θscn and angle θm2 are each represented with an absolute value. A unit of the angle is a "degree". The local power does not mean power of a mirror as a whole but power at a local region of the mirror.

Figure 4:
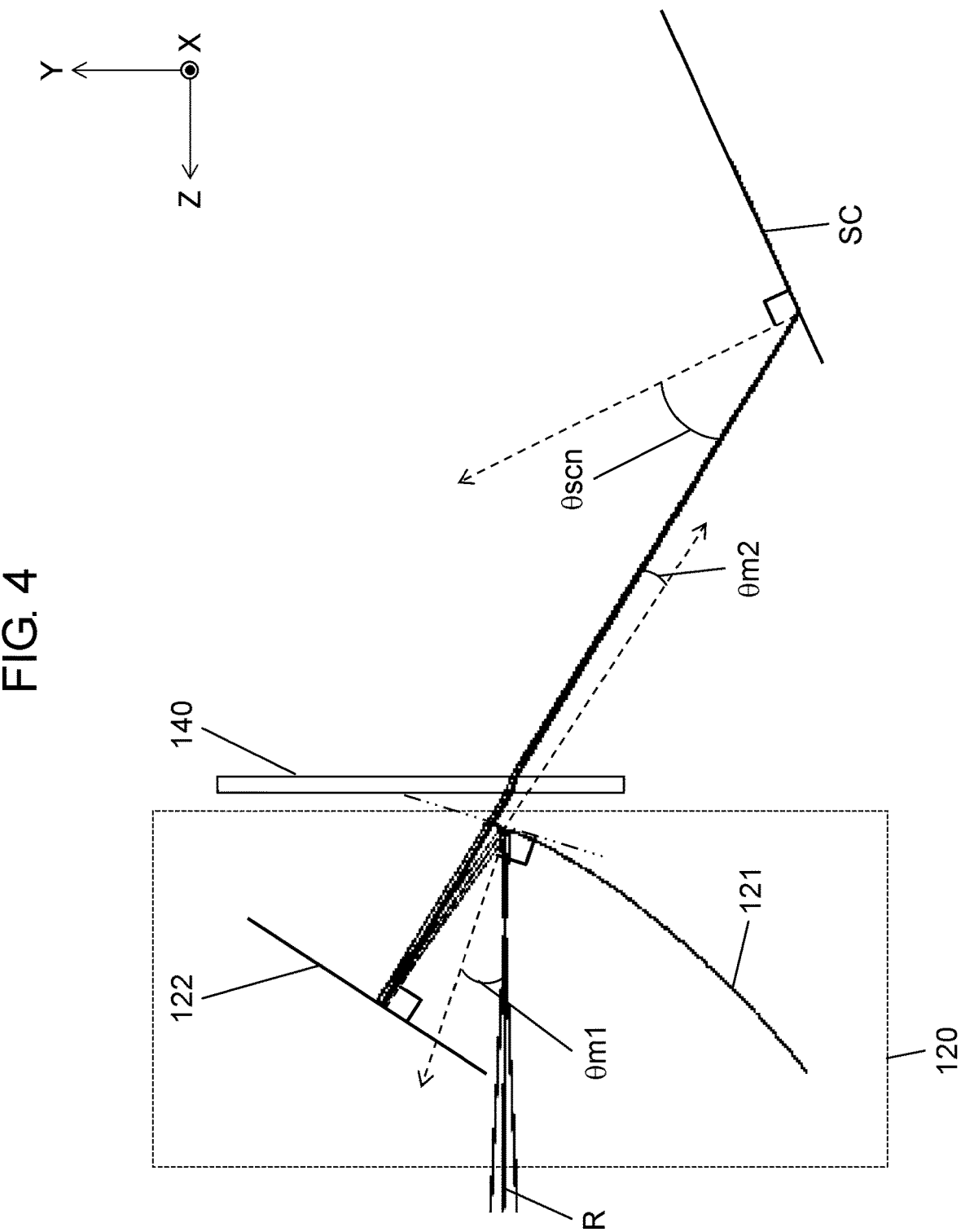
FIG. 4 is a view for describing a part of an optical path of the image projection device according to the present disclosure.

The conditional expression (1) defines a ratio of angle θscn (refer to FIG. 4) to angle θm2 (refer to FIG. 4). By satisfying the conditional expression (1), a projection optical system capable of reducing image distortion while being small in size can be provided. When the ratio exceeds an upper limit in the conditional expression (1), reference rays R passing through a portion closest to first mirror 121 among rays reflected by second mirror 122 interferes with an upper end of first mirror 121, thereby causing vignetting. Therefore, it becomes difficult to achieve a uniform illuminance distribution on screen SC. Furthermore, first mirror 121 generates unnecessary reflection light. This undesirably results in ghost. In contrast, when the ratio falls below a lower limit in the conditional expression (1), the interval between first mirror 121 and second mirror 122 needs to be widened to guide the rays on screen SC without causing vignetting. As a result, reflection optical system 120 is increased in size, thereby hindering downsizing of projection optical system 100.

By further satisfying the following conditional expression (1a), the above effect can be more enhanced.

$$1.4 < \theta scn/\theta m2 < 47.0 \quad (1a)$$

By further satisfying the following conditional expression (1b), the above effect can be more enhanced.

$$1.8 < \theta scn/\theta m2 < 44.0 \quad (1b)$$

By further satisfying the following conditional expression (1c), the above effect can be more enhanced.

$$2.2 < \theta scn/\theta m2 < 41.0 \quad (1c)$$

By further satisfying the following conditional expression (1d), the above effect can be more enhanced.

$$2.6 < \theta scn/\theta m2 < 38.0 \quad (1d)$$

Projection optical system 100 having the basic configuration according to the present exemplary embodiment preferably satisfies the following conditional expression (2).

$$3.0 < D1/D2 < 15.0 \quad (2)$$

Here, D1 is an optical path length of the principal ray of reference rays R from a display surface of image display element 130 to first mirror 121. D2 is an optical path length of the principal ray of reference rays R from first mirror 121 to second mirror 122.

Note that, in the present disclosure, optical path length D1 and optical path length D2 are each represented with an absolute value.

The conditional expression (2) defines a ratio of optical path length D1 to optical path length D2. By satisfying the conditional expression (2), a projection optical system capable of reducing image distortion while achieving downsizing and height reduction can be provided. When the ratio exceeds an upper limit in the conditional expression (2), transmissive optical system 110 becomes larger in size than reflection optical system 120, thereby making downsizing of entire projection optical system 100 difficult. In contrast, when the ratio falls below a lower limit in the conditional expression (2), first mirror 121 is relatively apart from second mirror 122, thereby increasing an effective diameter of second mirror 122. Therefore, this case is unsuitable for height reduction of projection optical system 100 in the Y-axis direction.

By further satisfying the following conditional expression (2a), the above effect can be more enhanced.

$$4.0 < D1/D2 < 14.0 \quad (2a)$$

By further satisfying the following conditional expression (2b), the above effect can be more enhanced.

$$5.0 < D1/D2 < 13.0 \quad (2b)$$

By further satisfying the following conditional expression (2c), the above effect can be more enhanced.

$$5.7 < D1/D2 < 12.5 \quad (2c)$$

Projection optical system 100 having the basic configuration according to the present exemplary embodiment preferably satisfies the following conditional expression (1e).

$$\theta m2 < \theta scn \quad (1e)$$

The conditional expression (1e) defines a relationship between angle θm2 and angle θscn. By satisfying the conditional expression (1e), projection optical system 100 capable of reducing image distortion while keeping the size of reflection optical system 120 to be small can be provided. When the conditional expression (1e) is not satisfied, the rays reflected by first mirror 121 are expanded at second mirror 122, resulting in difficulty in reducing the height of reflection optical system 120. Therefore, downsizing of entire projection optical system 100 is made difficult.

Projection optical system 100 having the basic configuration according to the present exemplary embodiment preferably satisfies the following conditional expression (3).

$$\theta m2 < \theta m1 \tag{3}$$

Here, θm1 is an angle formed by a normal line of first mirror 121 at a position where the principal ray of reference rays R enters first mirror 121, and the principal ray of reference rays R.

Note that, in the present disclosure, angle θm1 is represented with an absolute value.

The conditional expression (3) defines a relationship between angle θm1 (refer to FIG. 4) and angle θm2. By satisfying the conditional expression (3), a distance between first mirror 121 and second mirror 122 can be reduced with respect to transmissive optical system 110. Therefore, projection optical system 100 capable of reducing image distortion while keeping the size of reflection optical system 120 to be small can be achieved. When the conditional expression (3) is not satisfied, it becomes difficult to reduce the distance between first mirror 121 and second mirror 122 while maintaining good optical performance of projection optical system 100.

Projection optical system 100 having the basic configuration according to the present exemplary embodiment preferably satisfies the following conditional expression (4).

$$0.5 < \theta scn/\theta m1 < 5.0 \tag{4}$$

The conditional expression (4) defines a ratio of angle θscn to angle θm1. By satisfying the conditional expression (4), a projection optical system capable of reducing image distortion while achieving downsizing and height reduction can be provided. When the ratio exceeds an upper limit in the conditional expression (4), it becomes difficult to maintain good distortion aberration. Particularly, distortion aberration on a deeper side of screen SC occurs in a + direction (pin-cushion type). In contrast, also when the ratio falls below a lower limit in the conditional expression (4), it similarly becomes difficult to maintain good distortion aberration. Particularly, the distortion aberration on the deeper side of screen SC occurs in a —direction (barrel type).

By further satisfying the following conditional expression (4a), the above effect can be more enhanced.

$$1.0 < \theta scn/\theta m1 < 4.0 \tag{4a}$$

By further satisfying the following conditional expression (4b), the above effect can be more enhanced.

$$1.5 < \theta scn/\theta m1 < 3.0 \tag{4b}$$

By further satisfying the following conditional expression (4c), the above effect can be more enhanced.

$$1.8 < \theta scn/\theta m1 < 2.7 \tag{4c}$$

Projection optical system 100 having the basic configuration according to the present exemplary embodiment preferably satisfies the following conditional expression (5).

$$0 < \theta scn + \theta m2 < 150 \tag{5}$$

The conditional expression (5) defines a sum of angle θm2 and angle θscn. By satisfying the conditional expression (5), projection optical system 100 capable of reducing image distortion while achieving downsizing and height reduction can be provided. When the sum exceeds an upper limit in the conditional expression (5), the rays entering second mirror 122 are expanded, resulting in difficulty in downsizing of projection optical system 100. In contrast, when the sum falls below a lower limit in the conditional expression (5), reference rays R passing through a portion closest to first mirror 121 among rays reflected by second mirror 122 interferes with an end of first mirror 121, thereby causing vignetting. Therefore, it becomes difficult to secure a uniform illuminance distribution on screen SC. Further, when the vignetting is caused in first mirror 121, the rays serve as unnecessary light, thereby causing ghost, for example.

By further satisfying the following conditional expression (5a), the above effect can be more enhanced.

$$8 < \theta scn + \theta m2 < 140 \tag{5a}$$

By further satisfying the following conditional expression (5b), the above effect can be more enhanced.

$$16 < \theta scn + \theta m2 < 120 \tag{5b}$$

By further satisfying the following conditional expression (5c), the above effect can be more enhanced.

$$24 < \theta scn + \theta m2 < 100 \tag{5c}$$

By further satisfying the following conditional expression (5d), the above effect can be more enhanced.

$$32 < \theta scn + \theta m2 < 60 \tag{5d}$$

Table 1 to Table 6 indicate corresponding values for conditional expressions calculated for projection optical system 100 according to a first numerical example to a sixth numerical example.

(Corresponding Values for Conditional Expressions)

TABLE 1

| | First numerical example | | |
|---|---|---|---|
| | Short-side 0% region | Short-side 50% region | Short-side 100% region |
| θm1 | 22.07 | 31.84 | 33.50 |
| θm2 | 1.33 | 27.22 | 34.11 |
| θscn | 46.50 | 72.39 | 79.28 |
| D1 | 232.14 | 225.68 | 222.82 |
| D2 | 36.19 | 44.40 | 48.01 |
| θscn/θm2 | 35.02 | 2.66 | 2.32 |
| D1/D2 | 6.42 | 5.08 | 4.64 |
| θscn/θm1 | 2.11 | 2.27 | 2.37 |
| θscn + θm2 | 47.83 | 99.61 | 113.39 |

TABLE 2

| | Second numerical example | | |
|---|---|---|---|
| | Short-side 0% region | Short-side 50% region | Short-side 100% region |
| θm1 | 19.55 | 31.00 | 33.20 |
| θm2 | 1.30 | 29.98 | 37.86 |
| θscn | 41.32 | 70.00 | 77.88 |
| D1 | 219.50 | 213.59 | 210.67 |
| D2 | 35.68 | 43.86 | 47.78 |
| θscn/θm2 | 31.82 | 2.33 | 2.06 |

TABLE 2-continued

Second numerical example

|  | Short-side 0% region | Short-side 50% region | Short-side 100% region |
|---|---|---|---|
| D1/D2 | 6.15 | 4.87 | 4.41 |
| θscn/θm1 | 2.11 | 2.26 | 2.35 |
| θscn + θm2 | 42.62 | 99.99 | 115.73 |

TABLE 3

Third numerical example

|  | Short-side 0% region | Short-side 50% region | Short-side 100% region |
|---|---|---|---|
| θm1 | 18.40 | 30.54 | 32.99 |
| θm2 | 1.48 | 31.63 | 39.89 |
| θscn | 38.99 | 69.14 | 77.40 |
| D1 | 217.82 | 212.00 | 209.13 |
| D2 | 31.61 | 39.26 | 42.81 |
| θscn/θm2 | 26.43 | 2.19 | 1.94 |
| D1/D2 | 6.89 | 5.40 | 4.88 |
| θscn/θm1 | 2.12 | 2.26 | 2.35 |
| θscn + θm2 | 40.47 | 100.77 | 117.29 |

TABLE 4

Fourth numerical example

|  | Short-side 0% region | Short-side 50% region | Short-side 100% region |
|---|---|---|---|
| θm1 | 16.24 | 30.42 | 32.66 |
| θm2 | 1.90 | 35.48 | 44.43 |
| θscn | 34.38 | 67.96 | 76.91 |
| D1 | 218.67 | 213.10 | 209.60 |
| D2 | 24.91 | 31.59 | 34.04 |
| θscn/θm2 | 18.06 | 1.92 | 1.73 |
| D1/D2 | 8.78 | 6.75 | 6.16 |
| θscn/θm1 | 2.12 | 2.23 | 2.36 |
| θscn + θm2 | 36.29 | 103.44 | 121.34 |

TABLE 5

Fifth numerical example

|  | Short-side 0% region | Short-side 50% region | Short-side 100% region |
|---|---|---|---|
| θm1 | 16.59 | 31.12 | 33.09 |
| θm2 | 7.18 | 40.49 | 49.41 |
| θscn | 34.74 | 68.05 | 76.97 |
| D1 | 221.59 | 216.27 | 212.46 |
| D2 | 21.80 | 27.83 | 29.05 |
| θscn/θm2 | 4.84 | 1.68 | 1.56 |
| D1/D2 | 10.16 | 7.77 | 7.31 |
| θscn/θm1 | 2.09 | 2.19 | 2.33 |
| θscn + θm2 | 41.91 | 108.54 | 126.38 |

TABLE 6

Sixth numerical example

|  | Short-side 0% region | Short-side 50% region | Short-side 100% region |
|---|---|---|---|
| θm1 | 16.82 | 32.16 | 35.51 |
| θm2 | 12.34 | 45.56 | 54.39 |
| θscn | 34.87 | 68.09 | 76.91 |
| D1 | 225.20 | 220.55 | 218.09 |
| D2 | 18.88 | 24.21 | 25.43 |
| θscn/θm2 | 2.83 | 1.49 | 1.41 |
| D1/D2 | 11.93 | 9.11 | 8.58 |
| θscn/θm1 | 2.07 | 2.12 | 2.17 |
| θscn + θm2 | 47.21 | 113.65 | 131.30 |

The numerical examples specifically achieving the projection optical system according to the above-described exemplary embodiment will be described below. Note that in each numerical example, units of a length in the tables are all "mm", and units of a field angle in the tables are all "°". In each numerical example, r is a radius of curvature, d is a distance between surfaces, nd is a refractive index at the d-line, and vd is the Abbe number at the d-line. In each numerical example, a surface attached with * is an aspherical surface or a free curved surface, and an aspherical shape is defined by the following expression.

$$Z = \frac{cr^2}{1 + \sqrt{1-(1+k)c^2 r^2}} + Ar^4 + Br^6 + Cr^8 + Dr^{10} + Er^{12} + Fr^{14} + Gr^{16}$$ [Expression 1]

Here, z is a sag amount of a surface parallel to the Z axis, r is a distance in the radial direction ($=\sqrt{(x^2+y^2)}$), c is a curvature at a surface vertex, and k is a conic coefficient.

Note that, with respect to aspherical coefficients, only non-zero coefficients are shown other than conical constant K. In lens group data, a lens configuring length is an interval from a first surface to a final surface. A front-side principal point position is a distance from the first surface, and a rear-side principal point position is a distance from the first surface.

Furthermore, the free curved surface shape is defined by the following expressions using a local orthogonal coordinate system (x, y, z) defining its surface vertex as an origin.

$$Z = \frac{cr^2}{1 + \sqrt{1-(1+k)c^2 r^2}} + \sum_{j=2}^{66} C_j x^m y^n$$ [Expression 2]

$$J = \frac{(m+n)^2 + m + 3n}{2} + 1$$ [Expression 3]

Here, z is a sag amount of a surface parallel to the Z axis, r is a distance in the radial direction ($=\sqrt{(x^2+y^2)}$), c is a curvature at a surface vertex, k is a conic coefficient, and Cj is a coefficient of a monomial $x^m y^n$.

Note that, in the following data, an i-th order term of x and a j-th order term of y of a free curved surface coefficient in a polynomial is denoted as xiyj, for convenience. For example, "x2y" indicates a free curved surface coefficient with a second order term of x and a first order term of y in the polynomial.

For each numerical example, in image display element 130, a lowermost portion of the short side is defined as a 0% region, a center portion of the short side is defined as 50% region, and an uppermost portion of the short side is defined as 100% region.

First Numerical Example

Figure 5:
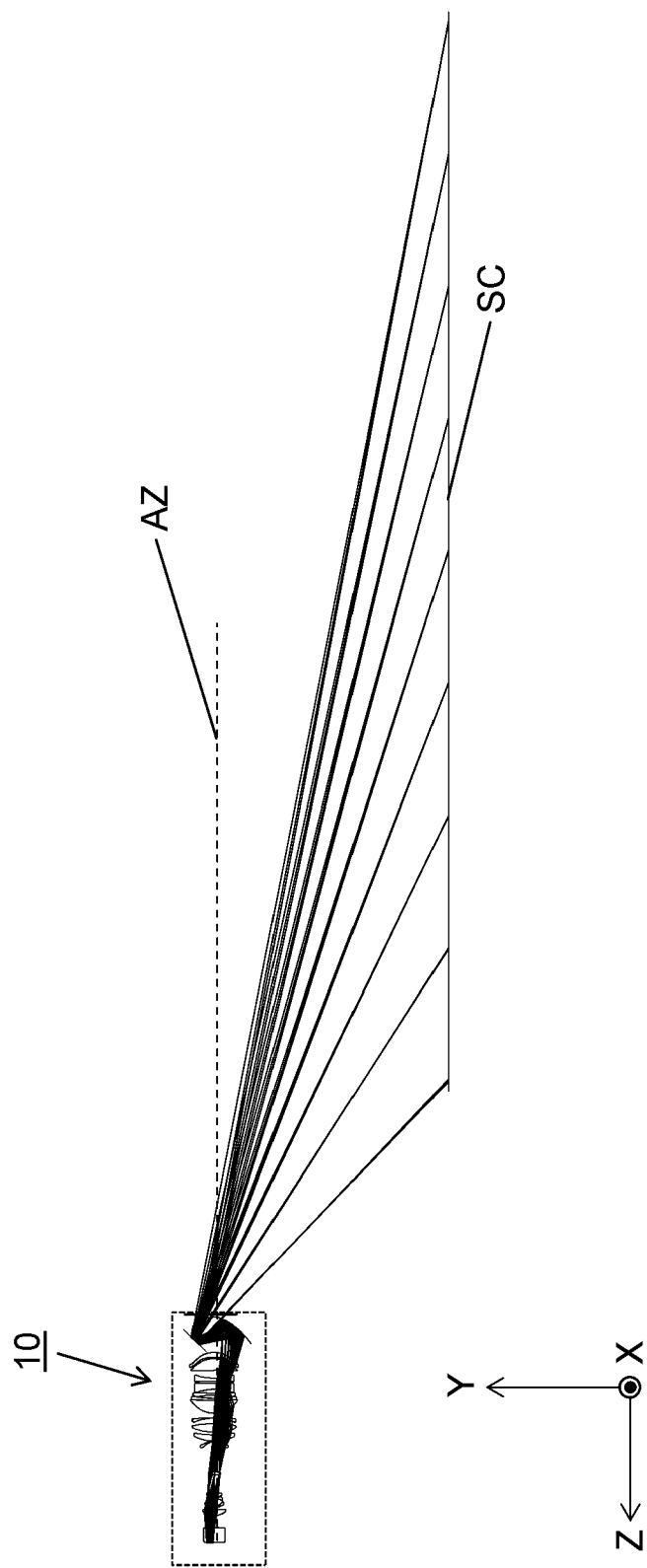
FIG. 5 is a configuration view of an image projection system in a first numerical example.

Table 7 to Table 11 below show specific data of transmissive optical system 110 of a first numerical example. Note that a slow ratio of the first numerical example is 0.147. Projection magnification of the first numerical example is 178.75. Sizes of image display element 130 to be used are 9.856 mm in a long-side direction and 6.162 mm in a short-side direction. FIG. 5 is a configuration view of image projection device 10 and screen SC in the first numerical example. When viewed in an X direction perpendicular to the paper plane, screen SC is disposed to be parallel to optical axis AZ of the transmissive optical system.

Surface data of respective optical elements in the first numerical example will be shown below in Table 7.

TABLE 7

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| DMD surface | | | | | | | | | | |
| 1 | | Infinity | Infinity | 1.000 | | | | −1.625 | | |
| 2 | | Infinity | Infinity | 15.000 | 1.51680 | 64.20 | | | | |
| 3 | | Infinity | Infinity | 12.436 | | | | | | |
| 4 | Aspherical surface | 19.296 | 19.296 | 6.273 | 1.52501 | 70.33 | | | | |
| 5 | Aspherical surface | −224.335 | −224.335 | 2.147 | | | | | | |
| 6 | | 16.655 | 16.655 | 1.400 | 2.00069 | 25.46 | | | | |
| 7 | | 9.910 | 9.910 | 7.600 | 1.49700 | 81.61 | | | | |
| 8 | | −19.320 | −19.320 | 1.500 | 1.95375 | 32.32 | | | | |
| 9 | | 61.985 | 61.985 | 0.919 | | | | | | |
| 10 | | 29.507 | 29.507 | 3.500 | 1.79925 | 24.62 | | | | |
| 11 | | −165.417 | −165.417 | 17.849 | | | | | | |
| 12 (diaphragm) | | Infinity | Infinity | 1.000 | | | 10.616 | | | |
| 13 | | −173.682 | −173.682 | 3.000 | 1.79925 | 24.62 | | | | |
| 14 | | −41.734 | −41.734 | 31.358 | | | | | | |
| 15 | | −14.682 | −14.682 | 0.700 | 1.88660 | 34.95 | | | | |
| 16 | | −23.719 | −23.719 | 0.100 | | | | | | |
| 17 | | 45.923 | 45.923 | 6.405 | 1.69895 | 30.05 | | | | |
| 18 | | 104.036 | 104.036 | 2.802 | | | | | | |
| 19 | | 57.204 | 57.204 | 8.933 | 1.74077 | 27.76 | | | | |
| 20 | | −112.308 | −112.308 | 5.557 | | | | | | |
| 21 | | −55.677 | −55.677 | 0.700 | 1.95375 | 32.32 | | | | |
| 22 | | −168.141 | −168.141 | 4.478 | | | | | | |
| 23 | | 27.973 | 27.973 | 13.457 | 1.66672 | 48.30 | | | | |
| 24 | | 588.073 | 588.073 | 2.000 | 1.94595 | 17.98 | | | | |
| 25 | | 98.856 | 98.856 | 3.202 | | | | | | |
| 26 | Aspherical surface | −84.007 | −84.007 | 2.000 | 1.58699 | 59.48 | | | | |
| 27 | Aspherical surface | 79.165 | 79.165 | 4.330 | | | | | | |
| 28 | | −50.167 | −50.167 | 5.987 | 1.92286 | 20.88 | | | | |
| 29 | | 287.559 | 287.559 | 2.120 | | | | | | |
| 30 | | −629.065 | −629.065 | 3.347 | 1.92286 | 20.88 | | | | |
| 31 | | 58.359 | 58.359 | 7.969 | | | | | | |
| 32 | | −443.446 | −443.446 | 11.681 | 1.51680 | 64.20 | | | | |
| 33 | | −30.585 | −30.585 | 1.267 | | | | | | |
| 34 | Aspherical surface | −74.073 | −74.073 | 5.000 | 1.49700 | 81.35 | | | | |
| 35 | Aspherical surface | −39.092 | −39.092 | 0.100 | | | | | | |
| 36 | Free curved surface mirror | −52.176 | −52.176 | −44.406 | | | −44.878 | −49.899 | | |
| 37 | Flat mirror | Infinity | Infinity | 6.157 | | | 82.094 | 5.083 | | |
| 38 | | Infinity | −118.000 | 2.000 | 1.51680 | 64.20 | 0.809 | 44.816 | | Only surface is eccentric |
| 39 | | Infinity | −120.000 | 391.876 | | | 0.809 | 44.816 | | Only surface is eccentric |
| Screen surface | | | | | | | | −45.175 | | |

Aspherical data is shown below in Table 8.

TABLE 8

| Coefficient | Fourth surface | Fifth surface | 26th surface | 27th surface | 34th surface | 35th surface |
|---|---|---|---|---|---|---|
| k | 0.19521 | 0.00000 | −34.47513 | 0.00000 | 1.01114 | 0.94147 |
| A | 3.5196E−05 | 5.2759E−05 | 2.1713E−05 | −2.0307E−05 | −4.1375E−05 | −2.6093E−05 |
| B | −4.1406E−08 | 1.1097E−07 | −2.2721E−07 | −9.2964E−08 | 7.1031E−09 | −3.6311E−08 |
| C | −6.2707E−10 | −2.3736E−09 | 8.4531E−10 | 3.9612E−10 | 7.4628E−11 | 1.5308E−10 |
| D | 2.5897E−12 | 8.7311E−12 | −1.1482E−12 | 2.9880E−13 | 1.8252E−14 | 9.2802E−14 |
| E | 2.0232E−14 | 9.6258E−14 | 2.6477E−16 | −2.3769E−15 | −7.9963E−17 | −2.7910E−16 |
| F | −7.2426E−17 | −1.0955E−15 | 7.5897E−19 | 2.9303E−18 | 1.4165E−20 | −1.4201E−19 |
| G | −6.3291E−19 | 2.5278E−18 | −4.6731E−22 | 0.0000E+00 | 0.0000E+00 | 3.1546E−22 |

Free curved surface data is shown below in Table 9.

TABLE 9

| Coefficient | Order | Free curved surface mirror |
|---|---|---|
| k | 0 | −3.23129E−01 |
| C4 | X2 | −9.33315E−04 |
| C6 | Y2 | 1.94316E−02 |
| C8 | X2Y | 2.72714E−05 |
| C10 | Y3 | −6.11867E−04 |
| C11 | X4 | 3.92587E−06 |
| C13 | X2Y2 | −4.08928E−06 |
| C15 | Y4 | 1.43237E−05 |
| C17 | X4Y | −6.52247E−07 |
| C19 | X2Y3 | 6.73798E−08 |
| C21 | Y5 | −1.51017E−07 |
| C22 | X6 | −4.76182E−09 |
| C24 | X4Y2 | 4.33680E−08 |
| C26 | X2Y4 | −4.11527E−09 |
| C28 | Y6 | 1.70566E−10 |
| C30 | X6Y | 6.34230E−10 |
| C32 | X4Y3 | −1.57154E−09 |
| C34 | X2Y5 | 3.98685E−10 |
| C36 | Y7 | 1.10333E−11 |
| C37 | X8 | 3.10386E−13 |
| C39 | X6Y2 | −3.16843E−11 |
| C41 | X4Y4 | 3.17090E−11 |
| C43 | X2Y6 | −1.66081E−11 |
| C45 | Y8 | −3.24419E−14 |
| C47 | X8Y | −4.29770E−14 |
| C49 | X6Y3 | 7.40632E−13 |
| C51 | X4Y5 | −3.30054E−13 |
| C53 | X2Y7 | 2.95486E−13 |
| C55 | Y9 | 6.70869E−16 |
| C56 | X10 | 4.12846E−16 |
| C58 | X8Y2 | 2.30353E−16 |
| C60 | X6Y4 | −6.94285E−15 |
| C62 | X4Y6 | 1.43920E−15 |
| C64 | X2Y8 | −2.03654E−15 |
| C66 | Y10 | −1.54657E−17 |

Focal lengths of respective lenses are shown below in Table 10.

TABLE 10

| L1 | 34.15 |
|---|---|
| L2 | −27.29 |
| L3 | 14.42 |
| L4 | −15.31 |
| L2L3L4 | −41.93 |
| L5 | 31.58 |
| L6 | 68.04 |
| L7 | −45.11 |
| L8 | 112.52 |
| L9 | 52.34 |
| L10 | −87.54 |
| L11 | 43.63 |
| L12 | −125.87 |
| L11L12 | 59.78 |
| L13 | −69.12 |
| L14 | −45.90 |
| L15 | −57.734 |
| L16 | 62.958 |
| L17 | 159.0072 |

Focal lengths of respective lens groups are shown below in Table 11.

TABLE 11

| First group | 34.15 |
|---|---|
| Second group | 172.19 |
| Third group | 78.75 |
| Fourth group | 341.42 |

Second Numerical Example

Figure 6:
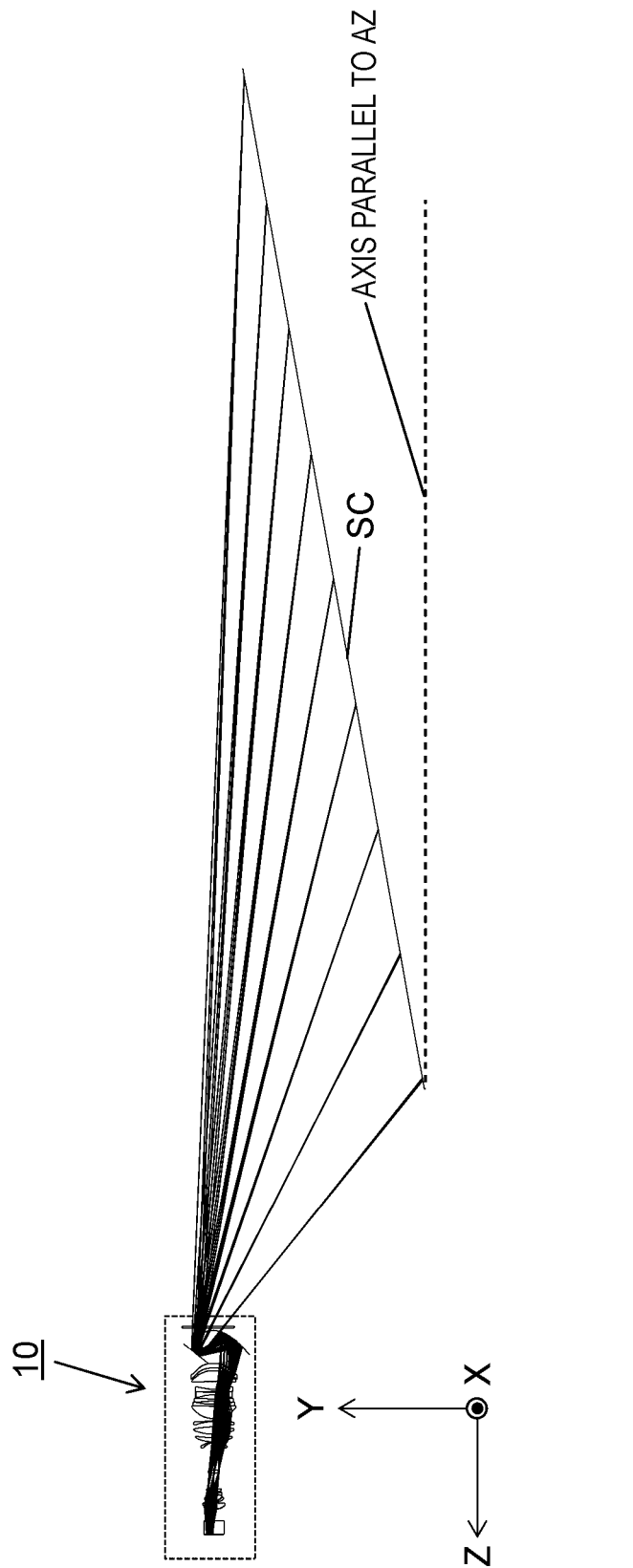
FIG. 6 is a configuration view of an image projection system in a second numerical example.

Table 12 to Table 16 below show specific data of transmissive optical system 110 of a second numerical example. Note that a slow ratio of the second numerical example is 0.165. Projection magnification of the second numerical example is 178.22. Sizes of image display element 130 to be used are 9.856 mm in a long-side direction and 6.162 mm in a short-side direction. FIG. 6 is a configuration view of projection optical system 100 and screen SC in the second numerical example. When viewed in an X direction perpendicular to the paper plane, screen SC is disposed to be inclined at 10 degrees to optical axis AZ of the transmissive optical system.

Surface data of respective optical elements in the second numerical example will be shown below in Table 12.

TABLE 12

| Surface number | r (radius of curvature of y) | r (radius of curvature of x) | d | nd | vd | Effective diameter | Eccentricity of y | Tilt α | Notes |
|---|---|---|---|---|---|---|---|---|---|
| DMD surface | | | | | | | | | |
| 1 | Infinity | Infinity | 1.000 | | | | −1.490 | | |
| 2 | Infinity | Infinity | 15.000 | 1.51680 | 64.20 | | | | |

TABLE 12-continued

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| 3 | | Infinity | Infinity | 11.750 | | | | | | |
| 4 | Aspherical surface | 19.685 | 19.685 | 6.423 | 1.52501 | 70.33 | | | | |
| 5 | Aspherical surface | −107.184 | −107.184 | 1.075 | | | | | | |
| 6 | | 16.792 | 16.792 | 1.400 | 2.00069 | 25.46 | | | | |
| 7 | | 9.973 | 9.973 | 7.600 | 1.49700 | 81.61 | | | | |
| 8 | | −19.869 | −19.869 | 1.500 | 1.95375 | 32.32 | | | | |
| 9 | | 59.864 | 59.864 | 0.741 | | | | | | |
| 10 | | 30.044 | 30.044 | 3.500 | 1.79925 | 24.62 | | | | |
| 11 | | −161.721 | −161.721 | 16.464 | | | | | | |
| 12 (diaphragm) | | Infinity | Infinity | 1.000 | | | 10.047 | | | |
| 13 | | −183.503 | −183.503 | 3.000 | 1.79925 | 24.62 | | | | |
| 14 | | −41.089 | −41.089 | 29.395 | | | | | | |
| 15 | | −14.557 | −14.557 | 0.700 | 1.88660 | 34.95 | | | | |
| 16 | | −23.392 | −23.392 | 0.100 | | | | | | |
| 17 | | 46.104 | 46.104 | 4.523 | 1.69895 | 30.05 | | | | |
| 18 | | 103.256 | 103.256 | 3.629 | | | | | | |
| 19 | | 56.920 | 56.920 | 7.995 | 1.74077 | 27.76 | | | | |
| 20 | | −112.892 | −112.892 | 5.684 | | | | | | |
| 21 | | −55.817 | −55.817 | 0.700 | 1.95375 | 32.32 | | | | |
| 22 | | −168.967 | −168.967 | 2.310 | | | | | | |
| 23 | | 28.068 | 28.068 | 13.651 | 1.66672 | 48.30 | | | | |
| 24 | | 1333.093 | 1333.093 | 2.000 | 1.94595 | 17.98 | | | | |
| 25 | | 93.843 | 93.843 | 3.518 | | | | | | |
| 26 | Aspherical surface | −68.564 | −68.564 | 2.000 | 1.58699 | 59.48 | | | | |
| 27 | Aspherical surface | 72.685 | 72.685 | 4.495 | | | | | | |
| 28 | | −52.557 | −52.557 | 2.787 | 1.92286 | 20.88 | | | | |
| 29 | | 358.228 | 358.228 | 0.843 | | | | | | |
| 30 | | −1218.409 | −1218.409 | 2.406 | 1.92286 | 20.88 | | | | |
| 31 | | 66.308 | 66.308 | 8.057 | | | | | | |
| 32 | | −669.245 | −669.245 | 11.997 | 1.51680 | 64.20 | | | | |
| 33 | | −30.597 | −30.597 | 2.717 | | | | | | |
| 34 | Aspherical surface | −65.351 | −65.351 | 5.000 | 1.49700 | 81.35 | | | | |
| 35 | Aspherical surface | −39.577 | −39.577 | 0.100 | | | | | | |
| 36 | Free curved surface mirror | −52.273 | −52.273 | −47.015 | | | −44.649 | −49.340 | | |
| 37 | Flat mirror | Infinity | Infinity | 5.049 | | | 82.337 | 9.365 | | |
| 38 | | Infinity | −118.000 | 2.000 | 1.51680 | 64.20 | 4.386 | 39.976 | | Only surface is eccentric |
| 39 | | Infinity | −120.000 | 398.443 | | | 4.386 | 39.976 | | Only surface is eccentric |
| Screen surface | | | | | | | | −40.020 | | |

Aspherical data is shown below in Table 13.

TABLE 13

| Coefficient | Fourth surface | Fifth surface | 26th surface | 27th surface | 34th surface | 35th surface |
|---|---|---|---|---|---|---|
| k | 0.17399 | 0.00000 | −24.30963 | 0.00000 | 3.04203 | 0.98583 |
| A | 3.3685E−05 | 4.8860E−05 | 2.1640E−05 | −1.9435E−05 | −4.2264E−05 | −2.7007E−05 |
| B | −4.1629E−08 | 1.0676E−07 | −2.2651E−07 | −9.4019E−08 | 4.3602E−09 | −3.7769E−08 |
| C | −5.9080E−10 | −2.3561E−09 | 8.4645E−10 | 3.9226E−10 | 7.1266E−11 | 1.5138E−10 |
| D | 2.6320E−12 | 9.2386E−12 | −1.1483E−12 | 3.0019E−13 | 2.0344E−14 | 8.8823E−14 |
| E | 1.9869E−14 | 9.9416E−14 | 2.6074E−16 | −2.3438E−15 | −7.4820E−17 | −2.8454E−16 |
| F | −6.5902E−17 | −1.0945E−15 | 7.4835E−19 | 3.0350E−18 | 4.6213E−21 | −1.4345E−19 |
| G | −4.9623E−19 | 2.5866E−18 | −4.9614E−22 | 0.0000E+00 | 0.0000E+00 | 3.2918E−22 |

Free curved surface data is shown below in Table 14.

TABLE 14

| Coefficient | Order | Free curved surface mirror |
|---|---|---|
| k | 0 | −0.323129172 |
| C4 | X2 | −8.59205E−04 |
| C6 | Y2 | 1.94940E−02 |
| C8 | X2Y | 2.34808E−05 |
| C10 | Y3 | −6.13444E−04 |
| C11 | X4 | 3.95460E−06 |
| C13 | X2Y2 | −4.02310E−06 |
| C15 | Y4 | 1.42879E−05 |
| C17 | X4Y | −6.53282E−07 |
| C19 | X2Y3 | 6.85456E−08 |
| C21 | Y5 | −1.51029E−07 |
| C22 | X6 | −4.73789E−09 |
| C24 | X4Y2 | 4.33272E−08 |
| C26 | X2Y4 | −4.12063E−09 |
| C28 | Y6 | 1.74258E−10 |
| C30 | X6Y | 6.31765E−10 |
| C32 | X4Y3 | −1.56829E−09 |
| C34 | X2Y5 | 3.98188E−10 |
| C36 | Y7 | 1.10990E−11 |
| C37 | X8 | 4.62845E−13 |
| C39 | X6Y2 | −3.17926E−11 |
| C41 | X4Y4 | 3.16716E−11 |
| C43 | X2Y6 | −1.66205E−11 |
| C45 | Y8 | −3.21842E−14 |
| C47 | X8Y | −4.44554E−14 |
| C49 | X6Y3 | 7.37531E−13 |
| C51 | X4Y5 | −3.31647E−13 |
| C53 | X2Y7 | 2.95417E−13 |
| C55 | Y9 | 6.40680E−16 |
| C56 | X10 | 5.34850E−16 |
| C58 | X8Y2 | 7.74437E−17 |
| C60 | X6Y4 | −6.67116E−15 |
| C62 | X4Y6 | 1.43600E−15 |
| C64 | X2Y8 | −2.02579E−15 |
| C66 | Y10 | −1.69143E−17 |

Focal lengths of respective lenses are shown below in Table 15.

TABLE 15

| L1 | 32.24 |
|---|---|
| L2 | −27.35 |
| L3 | 14.59 |
| L4 | −15.50 |
| L2L3L4 | −41.65 |
| L5 | 31.96 |
| L6 | 65.63 |
| L7 | −45.15 |
| L8 | 115.42 |
| L9 | 52.13 |
| L10 | −87.66 |
| L11 | 42.82 |
| L12 | −106.80 |
| L11L12 | 62.30 |
| L13 | −59.79 |
| L14 | −49.50 |
| L15 | −68.0814 |
| L16 | 61.6473 |
| L17 | 189.6923 |

Focal lengths of respective lens groups are shown below in Table 16.

TABLE 16

| First group | 32.24 |
|---|---|
| Second group | 191.77 |
| Third group | 76.15 |
| Fourth group | 408.83 |

Third Numerical Example

Figure 7:
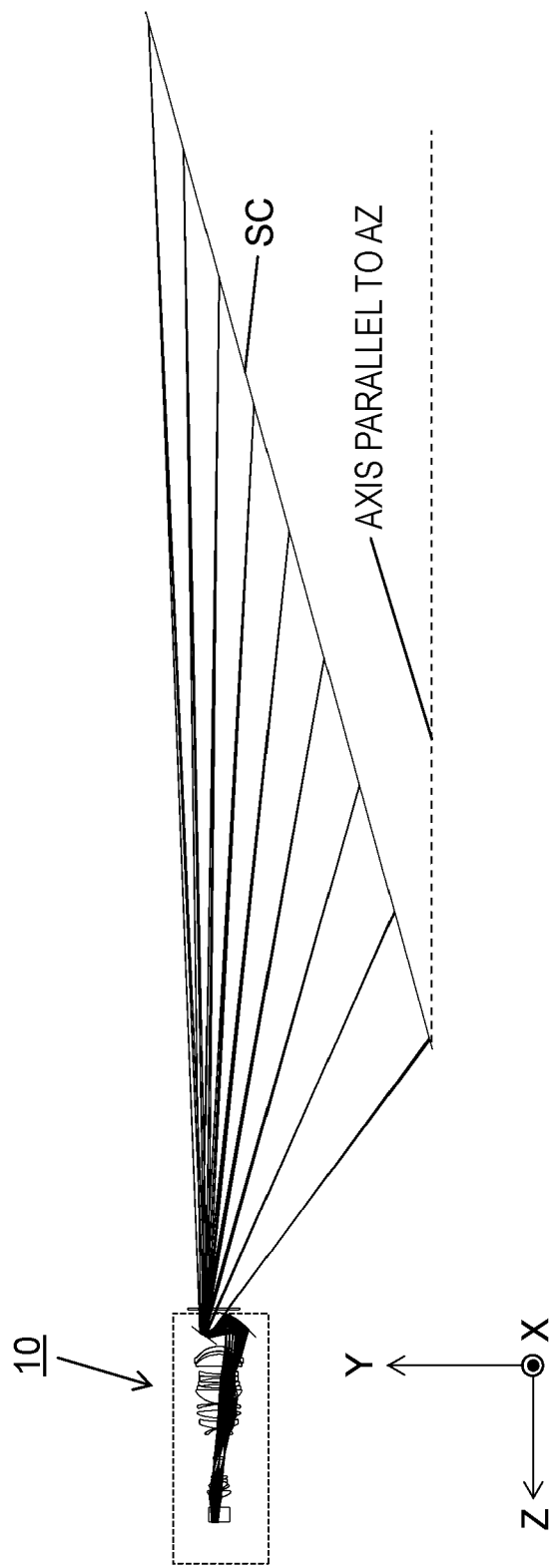
FIG. 7 is a configuration view of an image projection system in a third numerical example.

Table 17 to Table 21 below show specific data of transmissive optical system 110 of a third numerical example. Note that a slow ratio of the third numerical example is 0.170. Projection magnification of the third numerical example is 178.73. Sizes of image display element 130 to be used are 9.856 mm in a long-side direction and 6.162 mm in a short-side direction. FIG. 7 is a configuration view of image projection device 10 and screen SC in the third numerical example. When viewed in an X direction perpendicular to the paper plane, screen SC is disposed to be inclined at 15 degrees to optical axis AZ of the transmissive optical system.

Surface data of respective optical elements in the third numerical example will be shown below in Table 17.

TABLE 17

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| DMD surface | | | | | | | | | | |
| 1 | | Infinity | Infinity | 1.000 | | | | −1.413 | | |
| 2 | | Infinity | Infinity | 15.000 | 1.51680 | 64.20 | | | | |
| 3 | | Infinity | Infinity | 11.000 | | | | | | |
| 4 | Aspherical surface | 19.604 | 19.604 | 6.605 | 1.52501 | 70.33 | | | | |
| 5 | Aspherical surface | −98.540 | −98.540 | 0.784 | | | | | | |
| 6 | | 16.726 | 16.726 | 1.400 | 2.00069 | 25.46 | | | | |
| 7 | | 9.998 | 9.998 | 7.600 | 1.49700 | 81.61 | | | | |
| 8 | | −20.060 | −20.060 | 1.500 | 1.95375 | 32.32 | | | | |
| 9 | | 60.865 | 60.865 | 0.442 | | | | | | |
| 10 | | 30.048 | 30.048 | 3.500 | 1.79925 | 24.62 | | | | |
| 11 | | −156.814 | −156.814 | 16.286 | | | | | | |
| 12 (diaphragm) | | Infinity | Infinity | 1.000 | | | 9.702 | | | |
| 13 | | −185.450 | −185.450 | 3.000 | 1.79925 | 24.62 | | | | |
| 14 | | −41.024 | −41.024 | 28.332 | | | | | | |
| 15 | | −14.569 | −14.569 | 0.700 | 1.88660 | 34.95 | | | | |
| 16 | | −23.202 | −23.202 | 0.100 | | | | | | |

TABLE 17-continued

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| 17 | | 46.141 | 46.141 | 7.286 | 1.69895 | 30.05 | | | | |
| 18 | | 102.570 | 102.570 | 3.903 | | | | | | |
| 19 | | 56.952 | 56.952 | 7.994 | 1.74077 | 27.76 | | | | |
| 20 | | −112.876 | −112.876 | 5.786 | | | | | | |
| 21 | | −56.037 | −56.037 | 0.700 | 1.95375 | 32.32 | | | | |
| 22 | | −167.258 | −167.258 | 0.531 | | | | | | |
| 23 | | 28.170 | 28.170 | 13.933 | 1.66672 | 48.30 | | | | |
| 24 | | 1412.329 | 1412.329 | 2.000 | 1.94595 | 17.98 | | | | |
| 25 | | 92.013 | 92.013 | 3.512 | | | | | | |
| 26 | Aspherical surface | −71.096 | −71.096 | 2.000 | 1.58699 | 59.48 | | | | |
| 27 | Aspherical surface | 72.273 | 72.273 | 4.548 | | | | | | |
| 28 | | −52.927 | −52.927 | 2.073 | 1.92286 | 20.88 | | | | |
| 29 | | 362.307 | 362.307 | 0.755 | | | | | | |
| 30 | | −1347.178 | −1347.178 | 1.969 | 1.92286 | 20.88 | | | | |
| 31 | | 67.911 | 67.911 | 8.143 | | | | | | |
| 32 | | −847.537 | −847.537 | 12.169 | 1.51680 | 64.20 | | | | |
| 33 | | −30.731 | −30.731 | 2.988 | | | | | | |
| 34 | Aspherical surface | −63.864 | −63.864 | 5.000 | 1.49700 | 81.35 | | | | |
| 35 | Aspherical surface | −39.765 | −39.765 | 0.100 | | | | | | |
| 36 | Free curved surface mirror | −52.151 | −52.151 | −44.453 | | | −44.562 | −49.125 | | |
| 37 | Flat mirror | Infinity | Infinity | 6.122 | | | 81.365 | 11.644 | | |
| 38 | | Infinity | −118.000 | 2.000 | 1.51680 | 64.20 | 1.476 | 37.479 | | Only surface is eccentric |
| 39 | | Infinity | −120.000 | 396.508 | | | 1.476 | 37.479 | | Only surface is eccentric |
| Screen surface | | | | | | | | −37.516 | | |

Aspherical data is shown below in Table 18.

TABLE 18

| Coefficient | Fourth surface | Fifth surface | 26th surface | 27th surface | 34th surface | 35th surface |
|---|---|---|---|---|---|---|
| k | 0.14519 | 0.00000 | −22.46949 | 0.00000 | 3.37302 | 0.97545 |
| A | 3.2785E−05 | 4.8627E−05 | 2.1599E−05 | −1.9273E−05 | −4.3245E−05 | −2.6546E−05 |
| B | −4.6577E−08 | 1.1075E−07 | −2.2634E−07 | −9.4041E−08 | 4.4133E−09 | −3.8288E−08 |
| C | −5.8008E−10 | −2.3931E−09 | 8.4689E−10 | 3.9125E−10 | 7.1786E−11 | 1.5052E−10 |
| D | 2.5361E−12 | 8.7676E−12 | −1.1479E−12 | 2.9702E−13 | 2.1991E−14 | 8.7575E−14 |
| E | 1.7417E−14 | 9.6073E−14 | 2.6030E−16 | −2.3441E−15 | −7.2066E−17 | −2.8593E−16 |
| F | −8.1652E−17 | −1.1087E−15 | 7.4621E−19 | 3.0715E−18 | 5.4511E−21 | −1.4300E−19 |
| G | −4.9249E−19 | 2.6713E−18 | −4.9764E−22 | 0.0000E+00 | 0.0000E+00 | 3.3685E−22 |

Free curved surface data is shown below in Table 19.

TABLE 19

| Coefficient | Order | Free curved surface mirror |
|---|---|---|
| k | 0 | −0.323129172 |
| C4 | X2 | −8.32646E−04 |
| C6 | Y2 | 1.95376E−02 |
| C8 | X2Y | 2.15765E−05 |
| C10 | Y3 | −6.14416E−04 |
| C11 | X4 | 3.96084E−06 |
| C13 | X2Y2 | −4.00565E−06 |
| C15 | Y4 | 1.42803E−05 |
| C17 | X4Y | −6.53457E−07 |
| C19 | X2Y3 | 6.92207E−08 |
| C21 | Y5 | −1.50980E−07 |
| C22 | X6 | −4.73743E−09 |
| C24 | X4Y2 | 4.33401E−08 |
| C26 | X2Y4 | −4.11962E−09 |
| C28 | Y6 | 1.75737E−10 |
| C30 | X6Y | 6.31989E−10 |
| C32 | X4Y3 | −1.56757E−09 |
| C34 | X2Y5 | 3.98014E−10 |
| C36 | Y7 | 1.11173E−11 |
| C37 | X8 | 4.40583E−13 |
| C39 | X6Y2 | −3.17712E−11 |
| C41 | X4Y4 | 3.16793E−11 |
| C43 | X2Y6 | −1.66256E−11 |
| C45 | Y8 | −3.23104E−14 |
| C47 | X8Y | −4.39165E−14 |
| C49 | X6Y3 | 7.37975E−13 |
| C51 | X4Y5 | −3.31824E−13 |
| C53 | X2Y7 | 2.95377E−13 |

TABLE 19-continued

| Coefficient | Order | Free curved surface mirror |
|---|---|---|
| C55 | Y9 | 6.30244E−16 |
| C56 | X10 | 4.65419E−16 |
| C58 | X8Y2 | 1.53756E−16 |
| C60 | X6Y4 | −6.75414E−15 |
| C62 | X4Y6 | 1.44465E−15 |
| C64 | X2Y8 | −2.02363E−15 |
| C66 | Y10 | −1.72373E−17 |

Focal lengths of respective lenses are shown below in Table 20.

TABLE 20

| L1 | 31.76 |
|---|---|
| L2 | −27.72 |
| L3 | 14.66 |
| L4 | −15.68 |
| L2L3L4 | −43.24 |
| L5 | 31.81 |
| L6 | 65.30 |
| L7 | −45.92 |
| L8 | 113.94 |
| L9 | 52.14 |
| L10 | −88.63 |
| L11 | 42.94 |
| L12 | −104.13 |
| L11L12 | 63.16 |
| L13 | −60.74 |
| L14 | −49.92 |
| L15 | −70.0093 |
| L16 | 61.39 |
| L17 | 198.3698 |

Focal lengths of respective lens groups are shown below in Table 21.

TABLE 21

| First group | 31.76 |
|---|---|
| Second group | 169.12 |
| Third group | 75.04 |
| Fourth group | 400.12 |

Fourth Numerical Example

Figure 8:
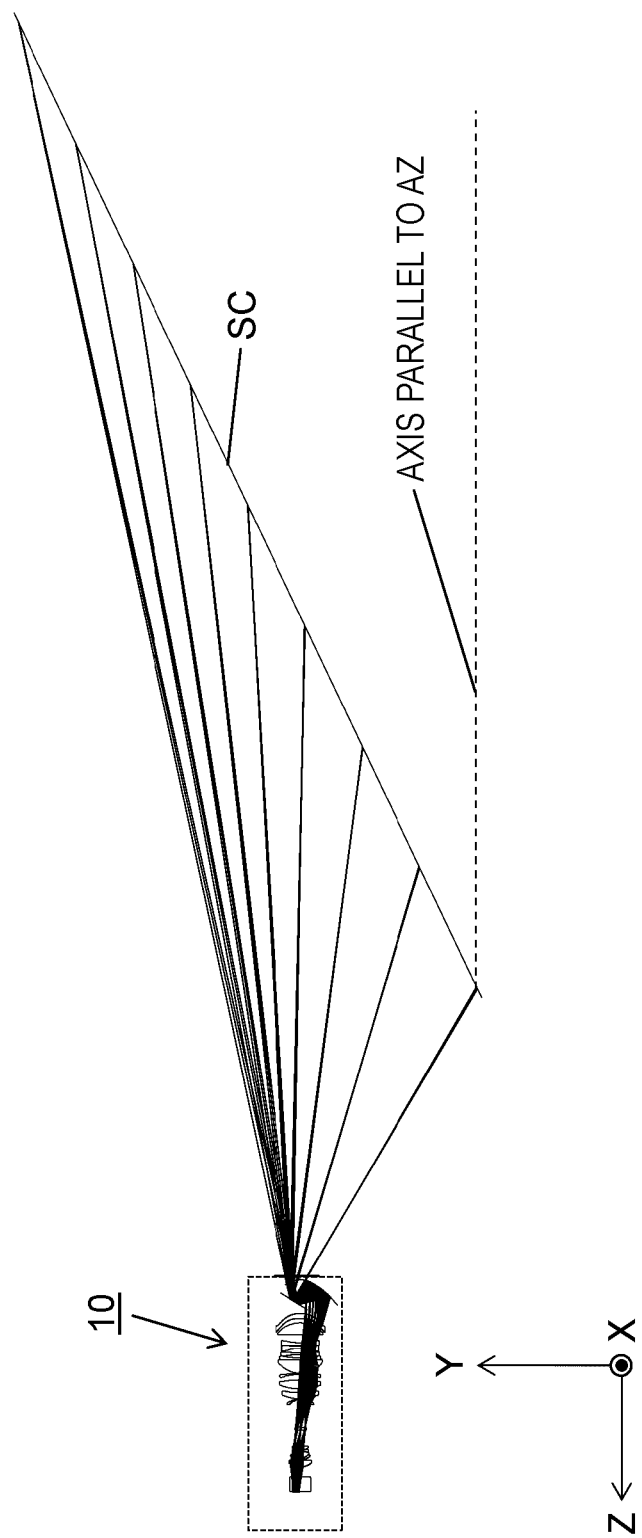
FIG. 8 is a configuration view of an image projection system in a fourth numerical example.

Table 22 to Table 26 below show specific data of transmissive optical system 110 of a fourth numerical example. Note that a slow ratio of the fourth numerical example is 0.175. Projection magnification of the fourth numerical example is 178.93. Sizes of image display element 130 to be used are 9.856 mm in a long-side direction and 6.162 mm in a short-side direction. FIG. 8 is a configuration view of image projection device 10 and screen SC in the fourth numerical example. When viewed in an X direction perpendicular to the paper plane, screen SC is disposed to be inclined at 25 degrees to optical axis AZ of the transmissive optical system.

Surface data of respective optical elements in the fourth numerical example will be shown below in Table 22.

TABLE 22

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| DMD surface | | | | | | | | | | |
| 1 | | Infinity | Infinity | 1.000 | | | | −1.217 | 0.000 | |
| 2 | | Infinity | Infinity | 15.000 | 1.51680 | 64.20 | | | | |
| 3 | | Infinity | Infinity | 10.500 | | | | | | |
| 4 | Aspherical surface | 19.552 | 19.552 | 6.807 | 1.52501 | 70.33 | | | | |
| 5 | Aspherical surface | −101.743 | −101.743 | 0.537 | | | | | | |
| 6 | | 16.685 | 16.685 | 1.400 | 2.00069 | 25.46 | | | | |
| 7 | | 10.003 | 10.003 | 7.600 | 1.49700 | 81.61 | | | | |
| 8 | | −19.911 | −19.911 | 1.500 | 1.95375 | 32.32 | | | | |
| 9 | | 61.956 | 61.956 | 0.135 | | | | | | |
| 10 | | 30.019 | 30.019 | 3.500 | 1.79925 | 24.62 | | | | |
| 11 | | −159.218 | −159.218 | 15.915 | | | | | | |
| 12 (diaphragm) | | Infinity | Infinity | 1.000 | | | 9.622 | | | |
| 13 | | −193.077 | −193.077 | 3.000 | 1.79925 | 24.62 | | | | |
| 14 | | −40.457 | −40.457 | 28.159 | | | | | | |
| 15 | | −14.646 | −14.646 | 0.700 | 1.88660 | 34.95 | | | | |
| 16 | | −22.871 | −22.871 | 0.100 | | | | | | |
| 17 | | 46.192 | 46.192 | 6.539 | 1.69895 | 30.05 | | | | |
| 18 | | 101.479 | 101.479 | 3.686 | | | | | | |
| 19 | | 57.300 | 57.300 | 9.259 | 1.74077 | 27.76 | | | | |
| 20 | | −112.543 | −112.543 | 5.733 | | | | | | |
| 21 | | −56.052 | −56.052 | 0.700 | 1.95375 | 32.32 | | | | |
| 22 | | −166.857 | −166.857 | 0.266 | | | | | | |
| 23 | | 28.265 | 28.265 | 13.831 | 1.66672 | 48.30 | | | | |
| 24 | | 1248.247 | 1248.247 | 2.000 | 1.94595 | 17.98 | | | | |
| 25 | | 92.491 | 92.491 | 3.353 | | | | | | |
| 26 | Aspherical surface | −77.794 | −77.794 | 2.000 | 1.58699 | 59.48 | | | | |
| 27 | Aspherical surface | 71.827 | 71.827 | 4.447 | | | | | | |
| 28 | | −52.909 | −52.909 | 2.854 | 1.92286 | 20.88 | | | | |
| 29 | | 364.486 | 364.486 | 0.628 | | | | | | |

TABLE 22-continued

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| 30 | | −1423.805 | −1423.805 | 2.546 | 1.92286 | 20.88 | | | | |
| 31 | | 67.145 | 67.145 | 8.220 | | | | | | |
| 32 | | −183971.524 | −183971.524 | 12.445 | 1.51680 | 64.20 | | | | |
| 33 | | −30.110 | −30.110 | 4.333 | | | | | | |
| 34 | Aspherical surface | −59.744 | −59.744 | 5.000 | 1.49700 | 81.35 | | | | |
| 35 | Aspherical surface | −40.226 | −40.226 | 0.396 | | | | | | |
| 36 | Free curved surface mirror | −51.943 | −51.943 | −40.328 | | | | −44.506 | −47.941 | |
| 37 | Flat mirror | Infinity | Infinity | 4.531 | | | | 81.208 | 15.659 | |
| 38 | | Infinity | −118.000 | 2.000 | 1.51680 | 64.20 | | 0.945 | 32.282 | Only surface is eccentric |
| 39 | | Infinity | −120.000 | 382.359 | | | | 0.945 | 32.282 | Only surface is eccentric |
| Screen surface | | | | | | | | | −32.479 | |

Aspherical data is shown below in Table 23.

TABLE 23

| Coefficient | Fourth surface | Fifth surface | 26th surface | 27th surface | 34th surface | 35th surface |
|---|---|---|---|---|---|---|
| k | 0.03592 | 0.00000 | −20.36291 | 0.00000 | 3.44467 | 1.03557 |
| A | 3.0596E−05 | 4.5292E−05 | 2.1496E−05 | −1.8814E−05 | −4.3557E−05 | −2.6635E−05 |
| B | −5.7430E−08 | 9.7830E−08 | −2.2651E−07 | −9.3748E−08 | 7.0969E−09 | −3.9962E−08 |
| C | −7.1940E−10 | −2.8495E−09 | 8.4646E−10 | 3.8987E−10 | 6.8579E−11 | 1.5063E−10 |
| D | 1.2522E−12 | 7.7405E−12 | −1.1496E−12 | 2.9053E−13 | 1.4187E−14 | 8.8729E−14 |
| E | 9.5474E−15 | 8.5288E−14 | 2.5722E−16 | −2.3562E−15 | −7.7678E−17 | −2.8512E−16 |
| F | −1.0882E−16 | −1.1489E−15 | 7.4643E−19 | 3.0539E−18 | 1.7439E−20 | −1.4473E−19 |
| G | −5.0225E−19 | 3.1965E−18 | −4.7239E−22 | 0.0000E+00 | 0.0000E+00 | 3.2900E−22 |

Free curved surface data is shown below in Table 24.

TABLE 24

| Coefficient | Order | Free curved surface mirror |
|---|---|---|
| k | 0 | −0.323129172 |
| C4 | X2 | −7.45784E−04 |
| C6 | Y2 | 1.96755E−02 |
| C8 | X2Y | 2.12715E−05 |
| C10 | Y3 | −6.13249E−04 |
| C11 | X4 | 4.01839E−06 |
| C13 | X2Y2 | −4.06156E−06 |
| C15 | Y4 | 1.42515E−05 |
| C17 | X4Y | −6.53147E−07 |
| C19 | X2Y3 | 6.93195E−08 |
| C21 | Y5 | −1.50962E−07 |
| C22 | X6 | −4.70474E−09 |
| C24 | X4Y2 | 4.33399E−08 |
| C26 | X2Y4 | −4.13645E−09 |
| C28 | Y6 | 1.78736E−10 |
| C30 | X6Y | 6.31607E−10 |
| C32 | X4Y3 | −1.56786E−09 |
| C34 | X2Y5 | 3.97620E−10 |
| C36 | Y7 | 1.11950E−11 |
| C37 | X8 | 3.53292E−13 |
| C39 | X6Y2 | −3.17444E−11 |
| C41 | X4Y4 | 3.16856E−11 |
| C43 | X2Y6 | −1.66354E−11 |
| C45 | Y8 | −3.13772E−14 |
| C47 | X8Y | −4.26010E−14 |
| C49 | X6Y3 | 7.38069E−13 |
| C51 | X4Y5 | −3.30051E−13 |
| C53 | X2Y7 | 2.95314E−13 |

TABLE 24-continued

| Coefficient | Order | Free curved surface mirror |
|---|---|---|
| C55 | Y9 | 6.22989E−16 |
| C56 | X10 | 3.90045E−16 |
| C58 | X8Y2 | 3.09454E−16 |
| C60 | X6Y4 | −6.83924E−15 |
| C62 | X4Y6 | 1.46980E−15 |
| C64 | X2Y8 | −2.02007E−15 |
| C66 | Y10 | −1.82094E−17 |

Focal lengths of respective lenses are shown below in Table 25.

TABLE 25

| L1 | 31.85 |
|---|---|
| L2 | −27.88 |
| L3 | 14.63 |
| L4 | −15.66 |
| L2L3L4 | −43.84 |
| L5 | 31.86 |
| L6 | 63.48 |
| L7 | −47.85 |
| L8 | 115.67 |
| L9 | 52.47 |
| L10 | −88.77 |
| L11 | 43.18 |
| L12 | −105.69 |
| L11L12 | 63.32 |
| L13 | −63.31 |
| L14 | −49.90 |

TABLE 25-continued

| | |
|---|---|
| L15 | −69.4243 |
| L16 | 58.2711 |
| L17 | 228.3324 |

Focal lengths of respective lens groups are shown below in Table 26.

TABLE 26

| | |
|---|---|
| First group | 31.85 |
| Second group | 168.91 |
| Third group | 69.90 |
| Fourth group | 345.29 |

Fifth Numerical Example

Figure 9:
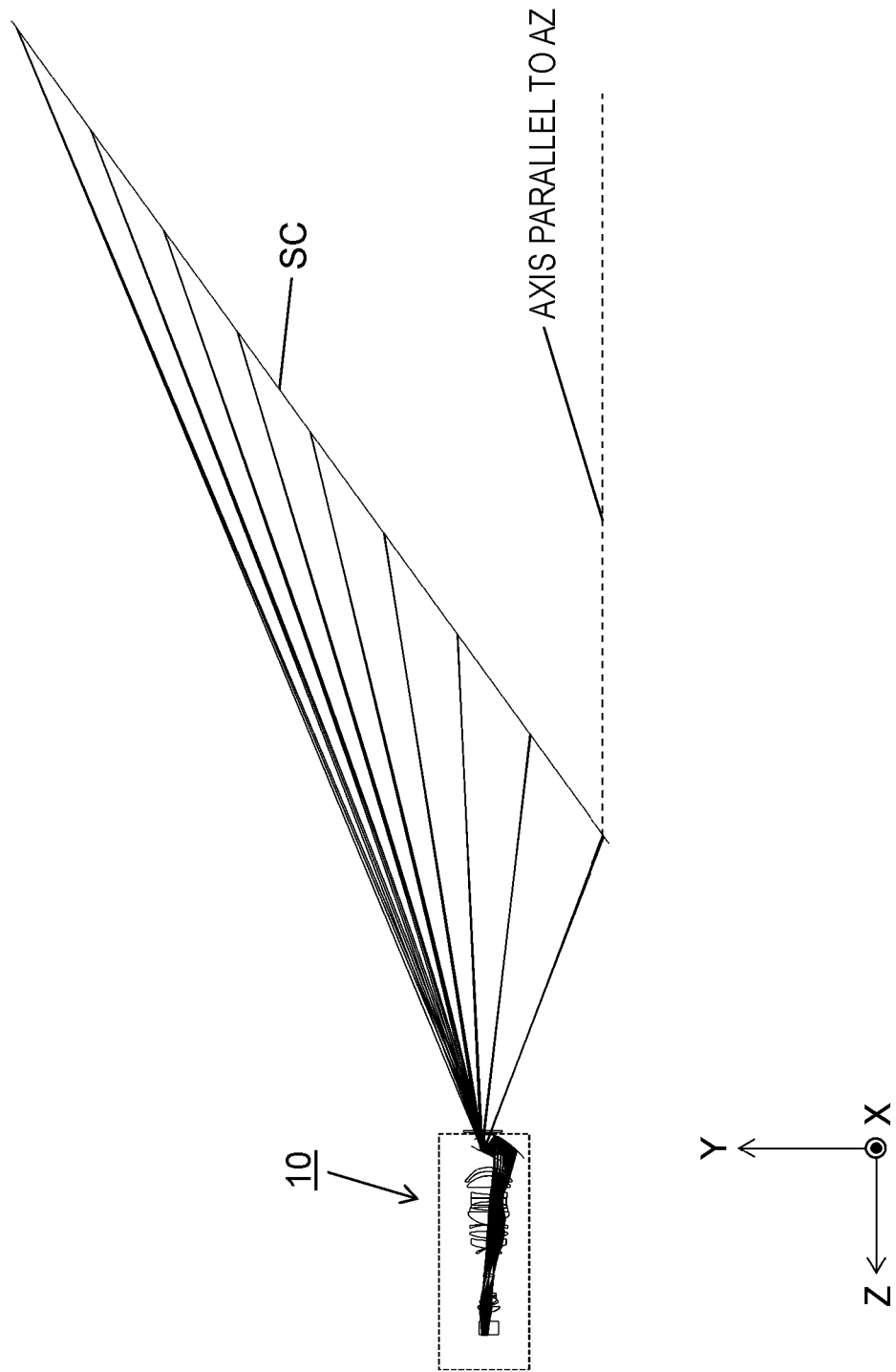
FIG. 9 is a configuration view of an image projection system in a fifth numerical example.

Table 27 to Table 31 below show specific data of transmissive optical system 110 of a fifth numerical example. Note that a slow ratio of the fifth numerical example is 0.174. Projection magnification of the fifth numerical example is 177.72. Sizes of image display element 130 to be used are 9.856 mm in a long-side direction and 6.162 mm in a short-side direction. FIG. 9 is a configuration view of image projection device 10 and screen SC in the fifth numerical example. When viewed in an X direction perpendicular to the paper plane, screen SC is disposed to be inclined at 35 degrees to optical axis AZ of the transmissive optical system.

Surface data of respective optical elements in the fifth numerical example will be shown in Table 27.

TABLE 27

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| DMD surface | | | | | | | | | | |
| 1 | | Infinity | Infinity | 1.000 | | | | −1.228 | 0.000 | |
| 2 | | Infinity | Infinity | 15.000 | 1.51680 | 64.20 | | | | |
| 3 | | Infinity | Infinity | 10.500 | | | | | | |
| 4 | Aspherical surface | 19.560 | 19.560 | 6.057 | 1.52501 | 70.33 | | | | |
| 5 | Aspherical surface | −107.066 | −107.066 | 1.005 | | | | | | |
| 6 | | 16.665 | 16.665 | 1.400 | 2.00069 | 25.46 | | | | |
| 7 | | 10.028 | 10.028 | 7.600 | 1.49700 | 81.61 | | | | |
| 8 | | −19.681 | −19.681 | 1.500 | 1.95375 | 32.32 | | | | |
| 9 | | 62.400 | 62.400 | 0.136 | | | | | | |
| 10 | | 29.822 | 29.822 | 3.500 | 1.79925 | 24.62 | | | | |
| 11 | | −165.720 | −165.720 | 16.771 | | | | | | |
| 12 (diaphragm) | | Infinity | Infinity | 1.000 | | | 9.708 | | | |
| 13 | | −186.348 | −186.348 | 3.000 | 1.79925 | 24.62 | | | | |
| 14 | | −40.462 | −40.462 | 27.632 | | | | | | |
| 15 | | −14.626 | −14.626 | 0.700 | 1.88660 | 34.95 | | | | |
| 16 | | −22.750 | −22.750 | 0.116 | | | | | | |
| 17 | | 46.093 | 46.093 | 8.836 | 1.69895 | 30.05 | | | | |
| 18 | | 102.082 | 102.082 | 2.814 | | | | | | |
| 19 | | 57.300 | 57.300 | 7.370 | 1.74077 | 27.76 | | | | |
| 20 | | −111.628 | −111.628 | 6.375 | | | | | | |
| 21 | | −56.329 | −56.329 | 0.700 | 1.95375 | 32.32 | | | | |
| 22 | | −165.340 | −165.340 | 0.563 | | | | | | |
| 23 | | 28.261 | 28.261 | 13.655 | 1.66672 | 48.30 | | | | |
| 24 | | 1540.000 | 1540.000 | 2.000 | 1.94595 | 17.98 | | | | |
| 25 | | 91.252 | 91.252 | 3.288 | | | | | | |
| 26 | Aspherical surface | −88.983 | −88.983 | 2.000 | 1.58699 | 59.48 | | | | |
| 27 | Aspherical surface | 72.452 | 72.452 | 4.128 | | | | | | |
| 28 | | −52.386 | −52.386 | 3.581 | 1.92286 | 20.88 | | | | |
| 29 | | 355.210 | 355.210 | 0.591 | | | | | | |
| 30 | | −2145.385 | −2145.385 | 3.599 | 1.92286 | 20.88 | | | | |
| 31 | | 66.549 | 66.549 | 8.229 | | | | | | |
| 32 | | 2087.542 | 2087.542 | 12.330 | 1.51680 | 64.20 | | | | |
| 33 | | −30.567 | −30.567 | 4.693 | | | | | | |
| 34 | Aspherical surface | −60.815 | −60.815 | 5.000 | 1.49700 | 81.35 | | | | |
| 35 | Aspherical surface | −39.298 | −39.298 | 1.672 | | | | | | |
| 36 | Free curved surface mirror | −51.703 | −51.703 | −39.501 | | | | −44.385 | −47.120 | |
| 37 | Flat mirror | Infinity | Infinity | 1.785 | | | | 81.395 | 19.677 | |
| 38 | | Infinity | −118.000 | 2.000 | 1.51680 | 64.20 | | 6.320 | 27.443 | Only surface is eccentric |

TABLE 27-continued

| Surface number | r (radius of curvature of y) | r (radius of curvature of x) | d | nd | vd | Effective diameter | Eccentricity of y | Tilt α | Notes |
|---|---|---|---|---|---|---|---|---|---|
| 39 | Infinity | −120.000 | 361.827 | | | 6.320 | | 27.443 | Only surface is eccentric |
| Screen surface | | | | | | | −27.562 | | |

Aspherical data is shown below in Table 28.

TABLE 28

| Coefficient | Fourth surface | Fifth surface | 26th surface | 27th surface | 34th surface | 35th surface |
|---|---|---|---|---|---|---|
| k | 0.13189 | 0.00000 | −19.14192 | 0.00000 | 3.14126 | 1.11382 |
| A | 3.1065E−05 | 4.8086E−05 | 2.1356E−05 | −1.8803E−05 | −4.2293E−05 | −2.7395E−05 |
| B | −3.1729E−08 | 1.1310E−07 | −2.2706E−07 | −9.3127E−08 | 5.7493E−09 | −3.7949E−08 |
| C | −6.0391E−10 | −2.3713E−09 | 8.4448E−10 | 3.9031E−10 | 7.0480E−11 | 1.4980E−10 |
| D | 1.8902E−12 | 8.1145E−12 | −1.1548E−12 | 2.8436E−13 | 1.2087E−14 | 8.8878E−14 |
| E | 1.4546E−14 | 8.5755E−14 | 2.4703E−16 | −2.3921E−15 | −9.0111E−17 | −2.8287E−16 |
| F | −8.8001E−17 | −1.1580E−15 | 7.4229E−19 | 2.9225E−18 | −1.4474E−21 | −1.4430E−19 |
| G | −6.0974E−19 | 3.1958E−18 | −3.8987E−22 | 0.0000E+00 | 0.0000E+00 | 3.2275E−22 |

Free curved surface data is shown below in Table 29.

TABLE 29

| Coefficient | Order | Free curved surface mirror |
|---|---|---|
| k | 0 | −0.323129172 |
| C4 | X2 | −6.67904E−04 |
| C6 | Y2 | 1.98391E−02 |
| C8 | X2Y | 1.90060E−05 |
| C10 | Y3 | −6.12416E−04 |
| C11 | X4 | 4.07716E−06 |
| C13 | X2Y2 | −4.08357E−06 |
| C15 | Y4 | 1.42701E−05 |
| C17 | X4Y | −6.53618E−07 |
| C19 | X2Y3 | 6.90884E−08 |
| C21 | Y5 | −1.51300E−07 |
| C22 | X6 | −4.66365E−09 |
| C24 | X4Y2 | 4.32986E−08 |
| C26 | X2Y4 | −4.15626E−09 |
| C28 | Y6 | 1.80439E−10 |
| C30 | X6Y | 6.32044E−10 |
| C32 | X4Y3 | −1.56726E−09 |
| C34 | X2Y5 | 3.97113E−10 |
| C36 | Y7 | 1.12575E−11 |
| C37 | X8 | 3.42619E−13 |
| C39 | X6Y2 | −3.17997E−11 |
| C41 | X4Y4 | 3.17576E−11 |
| C43 | X2Y6 | −1.66474E−11 |
| C45 | Y8 | −3.02820E−14 |
| C47 | X8Y | −3.87485E−14 |
| C49 | X6Y3 | 7.35759E−13 |
| C51 | X4Y5 | −3.28651E−13 |
| C53 | X2Y7 | 2.95213E−13 |
| C55 | Y9 | 6.28877E−16 |
| C56 | X10 | 3.05350E−16 |
| C58 | X8Y2 | 3.48960E−16 |
| C60 | X6Y4 | −6.84263E−15 |
| C62 | X4Y6 | 1.46814E−15 |
| C64 | X2Y8 | −2.01645E−15 |
| C66 | Y10 | −1.85571E−17 |

Focal lengths of respective lenses are shown below in Table 30.

TABLE 30

| L1 | 32.03 |
|---|---|
| L2 | −28.13 |
| L3 | 14.61 |
| L4 | −15.55 |
| L2L3L4 | −44.02 |
| L5 | 31.88 |
| L6 | 64.08 |
| L7 | −48.14 |
| L8 | 112.91 |
| L9 | 52.08 |
| L10 | −89.86 |
| L11 | 43.03 |
| L12 | −102.61 |
| L11L12 | 63.99 |
| L13 | −67.72 |
| L14 | −49.26 |
| L15 | −69.8876 |
| L16 | 58.41 |
| L17 | 207.4795 |

Focal lengths of respective lens groups are shown below in Table 31.

TABLE 31

| First group | 32.03 |
|---|---|
| Second group | 167.76 |
| Third group | 69.47 |
| Fourth group | 279.09 |

Sixth Numerical Example

Figure 10:
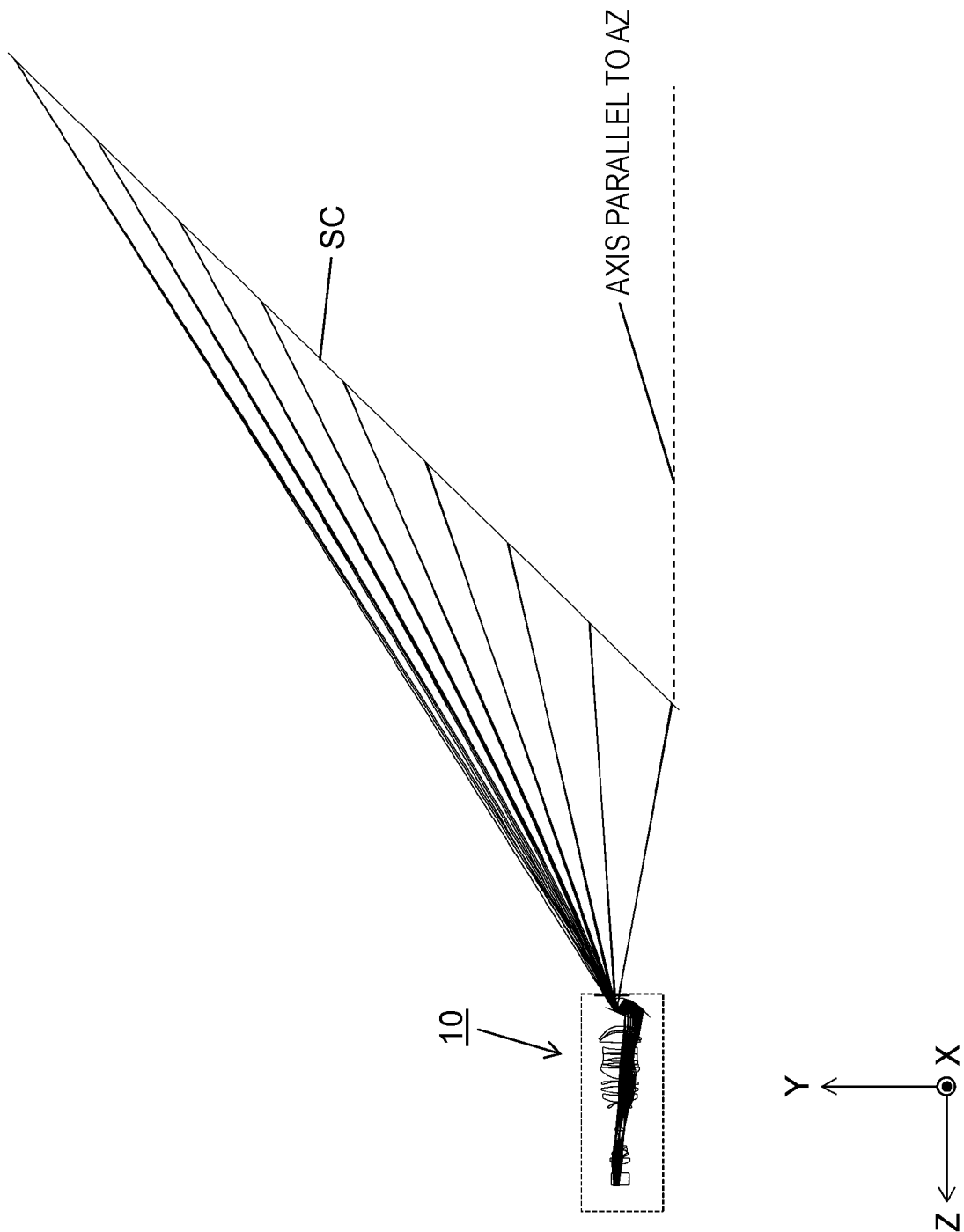
FIG. 10 is a configuration view of an image projection system in a sixth numerical example.

Table 32 to Table 36 below show specific data of transmissive optical system 110 of a sixth numerical example. Note that a slow ratio of the sixth numerical example is 0.175. Projection magnification of the sixth numerical example is 177.89. Sizes of image display element 130 to be used are 9.856 mm in a long-side direction and 6.162 mm in a short-side direction. FIG. 10 is a configuration view of image projection device 10 and screen SC in the sixth numerical example. When viewed in an X direction perpendicular to the paper plane, screen SC is disposed to be inclined at 45 degrees to optical axis AZ of the transmissive optical system.

Surface data of respective optical elements in the sixth numerical example will be shown below in Table 32.

TABLE 32

| Surface number | | r (radius of curvature of y) | r (radius of curvature of x) | d | nd | vd | Effective diameter | Eccentricity of y | Tilt α | Notes |
|---|---|---|---|---|---|---|---|---|---|---|
| DMD surface | | | | | | | | | | |
| 1 | | Infinity | Infinity | 1.000 | | | | −1.235 | 0.000 | |
| 2 | | Infinity | Infinity | 15.000 | 1.51680 | 64.20 | | | | |
| 3 | | Infinity | Infinity | 10.500 | | | | | | |
| 4 | Aspherical surface | 19.670 | 19.670 | 7.945 | 1.52501 | 70.33 | | | | |
| 5 | Aspherical surface | −125.519 | −125.519 | 0.471 | | | | | | |
| 6 | | 16.500 | 16.500 | 1.400 | 2.00069 | 25.46 | | | | |
| 7 | | 10.156 | 10.156 | 7.600 | 1.49700 | 81.61 | | | | |
| 8 | | −19.333 | −19.333 | 1.500 | 1.95375 | 32.32 | | | | |
| 9 | | 63.186 | 63.186 | 0.100 | | | | | | |
| 10 | | 29.838 | 29.838 | 3.500 | 1.79925 | 24.62 | | | | |
| 11 | | −178.709 | −178.709 | 16.837 | | | | | | |
| 12 (diaphragm) | | 1.0E+18 | 1.0E+18 | 1.000 | | | 9.815 | | | |
| 13 | | −174.667 | −174.667 | 3.000 | 1.79925 | 24.62 | | | | |
| 14 | | −40.726 | −40.726 | 30.327 | | | | | | |
| 15 | | −14.616 | −14.616 | 0.700 | 1.88660 | 34.95 | | | | |
| 16 | | −22.625 | −22.625 | 0.100 | | | | | | |
| 17 | | 46.162 | 46.162 | 8.089 | 1.69895 | 30.05 | | | | |
| 18 | | 102.793 | 102.793 | 2.527 | | | | | | |
| 19 | | 57.275 | 57.275 | 8.283 | 1.74077 | 27.76 | | | | |
| 20 | | −111.788 | −111.788 | 5.884 | | | | | | |
| 21 | | −56.149 | −56.149 | 0.700 | 1.95375 | 32.32 | | | | |
| 22 | | −164.252 | −164.252 | 2.345 | | | | | | |
| 23 | | 28.252 | 28.252 | 13.610 | 1.66672 | 48.30 | | | | |
| 24 | | 1284.756 | 1284.756 | 2.000 | 1.94595 | 17.98 | | | | |
| 25 | | 91.810 | 91.810 | 3.425 | | | | | | |
| 26 | Aspherical surface | −96.769 | −96.769 | 2.000 | 1.58699 | 59.48 | | | | |
| 27 | Aspherical surface | 74.796 | 74.796 | 4.067 | | | | | | |
| 28 | | −52.052 | −52.052 | 4.715 | 1.92286 | 20.88 | | | | |
| 29 | | 375.133 | 375.133 | 1.055 | | | | | | |
| 30 | | −2624.592 | −2624.592 | 4.558 | 1.92286 | 20.88 | | | | |
| 31 | | 69.222 | 69.222 | 8.306 | | | | | | |
| 32 | | 1819.292 | 1819.292 | 12.502 | 1.51680 | 64.20 | | | | |
| 33 | | −30.958 | −30.958 | 1.937 | | | | | | |
| 34 | Aspherical surface | −60.283 | −60.283 | 5.000 | 1.49700 | 81.35 | | | | |
| 35 | Aspherical surface | −38.646 | −38.646 | 0.233 | | | | | | |
| 36 | Free curved surface mirror | −51.479 | −51.479 | −37.762 | | | | −44.142 | −46.551 | |
| 37 | Flat mirror | Infinity | 1.0E+18 | 3.340 | | | | 78.157 | 24.066 | |
| 38 | | Infinity | −118.000 | 2.000 | 1.51680 | 64.20 | | 6.075 | 22.487 | Only surface is eccentric |
| 39 | | Infinity | −120.000 | 341.992 | | | | 6.075 | 22.487 | Only surface is eccentric |
| Screen surface | | | | | | | | | −22.527 | |

Aspherical data is shown below in Table 33.

TABLE 33

| Coefficient | Fourth surface | Fifth surface | 26th surface | 27th surface | 34th surface | 35th surface |
|---|---|---|---|---|---|---|
| k | −0.09615 | 0.00000 | −21.02499 | 0.00000 | 2.85923 | 1.21210 |
| A | 2.2977E−05 | 4.0141E−05 | 2.1317E−05 | −1.9014E−05 | −4.2384E−05 | −2.7623E−05 |
| B | −5.5246E−08 | 4.3571E−08 | −2.2786E−07 | −9.2176E−08 | 7.5389E−09 | −3.7853E−08 |
| C | −7.1339E−10 | −2.5813E−09 | 8.4204E−10 | 3.9422E−10 | 7.3989E−11 | 1.4741E−10 |
| D | 1.6517E−12 | 8.9540E−12 | −1.1580E−12 | 2.9042E−13 | 1.2492E−14 | 8.7707E−14 |

TABLE 33-continued

| Coefficient | Fourth surface | Fifth surface | 26th surface | 27th surface | 34th surface | 35th surface |
|---|---|---|---|---|---|---|
| E | 1.7154E−14 | 9.8331E−14 | 2.4716E−16 | −2.4057E−15 | −9.3983E−17 | −2.7824E−16 |
| F | −6.4873E−17 | −1.1427E−15 | 7.4987E−19 | 2.7462E−18 | −5.1559E−21 | −1.3385E−19 |
| G | −8.2306E−19 | 2.2252E−18 | −4.1121E−22 | 0.0000E+00 | 0.0000E+00 | 3.3445E−22 |

Free curved surface data is shown below in Table 34.

TABLE 34

| Coefficient | Order | Free curved surface mirror |
|---|---|---|
| k | 0 | −0.323129172 |
| C4 | X2 | −6.23280E−04 |
| C6 | Y2 | 2.00790E−02 |
| C8 | X2Y | 1.49643E−05 |
| C10 | Y3 | −6.11275E−04 |
| C11 | X4 | 4.13166E−06 |
| C13 | X2Y2 | −4.15103E−06 |
| C15 | Y4 | 1.42254E−05 |
| C17 | X4Y | −6.56844E−07 |
| C19 | X2Y3 | 7.15579E−08 |
| C21 | Y5 | −1.51593E−07 |
| C22 | X6 | −4.53075E−09 |
| C24 | X4Y2 | 4.32230E−08 |
| C26 | X2Y4 | −4.15296E−09 |
| C28 | Y6 | 1.82327E−10 |
| C30 | X6Y | 6.29938E−10 |
| C32 | X4Y3 | −1.56693E−09 |
| C34 | X2Y5 | 3.96413E−10 |
| C36 | Y7 | 1.13772E−11 |
| C37 | X8 | 4.26144E−13 |
| C39 | X6Y2 | −3.18203E−11 |
| C41 | X4Y4 | 3.18392E−11 |
| C43 | X2Y6 | −1.66627E−11 |
| C45 | Y8 | −2.80620E−14 |
| C47 | X8Y | −4.09888E−14 |
| C49 | X6Y3 | 7.36045E−13 |
| C51 | X4Y5 | −3.28021E−13 |
| C53 | X2Y7 | 2.95076E−13 |
| C55 | Y9 | 6.38235E−16 |
| C56 | X10 | 1.37111E−17 |
| C58 | X8Y2 | 6.25114E−16 |
| C60 | X6Y4 | −6.96875E−15 |
| C62 | X4Y6 | 1.47701E−15 |
| C64 | X2Y8 | −2.01372E−15 |
| C66 | Y10 | −1.94879E−17 |

Focal lengths of respective lenses are shown below in Table 35.

TABLE 35

| L1 | 33.01 |
|---|---|
| L2 | −29.67 |
| L3 | 14.65 |
| L4 | −15.39 |
| L2L3L4 | −46.68 |
| L5 | 32.23 |
| L6 | 65.80 |
| L7 | −48.56 |
| L8 | 113.23 |
| L9 | 52.21 |
| L10 | −89.74 |
| L11 | 43.14 |
| L12 | −104.61 |
| L11L12 | 63.66 |
| L13 | −71.56 |
| L14 | −49.27 |
| L15 | −73.0216 |
| L16 | 59.037 |
| L17 | 201.2063 |

Focal lengths of respective lens groups are shown below in Table 36.

TABLE 36

| First group | 33.01 |
|---|---|
| Second group | 150.26 |
| Third group | 70.72 |
| Fourth group | 226.88 |

Other Exemplary Embodiments

The exemplary embodiment has been described above to exemplify the technique disclosed in the present application. However, the technique in the present disclosure is not limited to the exemplary embodiment, and is also applicable to exemplary embodiments subjected to changes, replacements, additions, omissions, or the like. Further, the components described in the above exemplary embodiment can be combined to configure a new exemplary embodiment.

Note that the exemplary embodiment described above is provided to exemplify the technique in the present disclosure. Therefore, it is possible to make various changes, replacements, additions, omissions, and the like within the scope of the claims and equivalents thereof.

INDUSTRIAL APPLICABILITY

The present disclosure is applicable to a projection optical system for projecting an image displayed on an image display element. Specifically, the present disclosure is applicable to a projector installed in, for example, a building or a vehicle, a head-up display, and the like.

REFERENCE MARKS IN THE DRAWINGS

1: image projection system
10: image projection device
100: projection optical system
110: transmissive optical system
120: reflection optical system
121: first mirror (an example of a first reflecting surface)
122: second mirror (an example of a second reflecting surface)
130: image display element
140: transmissive element
A: aperture diaphragm
PB: prism
R: reference rays
SC: screen (projection target surface)

The invention claimed is:
1. A projection optical system for projecting an image in an image display element on a projection target surface in an enlarged manner, the projection optical system comprising:
a transmissive optical system including a plurality of lenses and an aperture diaphragm; and
a reflection optical system including a first reflecting surface that reflects light emitted from the transmissive optical system and a second reflecting surface that reflects light emitted from the first reflecting surface, wherein:

the projection target surface is not parallel to a display surface of the image display element, reference rays are rays projected on a position closest to the projection optical system in the image projected on the projection target surface, a principal ray of the reference rays is a ray passing through a center of the aperture diaphragm among the reference rays, local power of the first reflecting surface at a position where the principal ray of the reference rays enters the first reflecting surface is larger than local power of the second reflecting surface at a position where the principal ray of the reference rays enters the second reflecting surface, the projection optical system satisfies conditional expressions (1) and (2) shown below, $$1.0 < \theta scn/\theta m2 < 50.0 \quad (1)$$

$$3.0 < D1/D2 < 15.0 \quad (2)$$

where θscn is an angle formed by a normal line of the projection target surface at a position where the principal ray of the reference rays enters the projection target surface, and the principal ray of the reference rays, θm2 is an angle formed by a normal line of the second reflecting surface at a position where the principal ray of the reference rays enters the second reflecting surface, and the principal ray of the reference rays, D1 is an optical path length of the principal ray of the reference rays extending from a display surface of the image display element to the first reflecting surface, and D2 is an optical path length of the principal ray of the reference rays extending from the first reflecting surface to the second reflecting surface, the plurality of lenses include a closest lens that is closest to the first reflecting surface among the plurality of lenses, and the first and second reflecting surfaces are arranged such that a distance from the closest lens to the first reflecting surface is longer than a distance from the first reflecting surface to the second reflecting surface.

2. The projection optical system according to claim 1, wherein the second reflecting surface is disposed closer to the projection target surface than the transmissive optical system is.

3. The projection optical system according to claim 1, wherein the plurality of lenses include a negative meniscus lens and a biconvex lens, the image display element, the aperture diaphragm, the negative meniscus lens, and the biconvex lens are disposed in this order along an optical axis of the transmissive optical system, and a convex surface of the negative meniscus lens is directed toward the projection target surface.

4. The projection optical system according to claim 1, wherein the plurality of lenses include a positive meniscus lens, and the positive meniscus lens is disposed to be closest to the projection target surface among the plurality of lenses.

5. The projection optical system according to claim 1, wherein the first reflecting surface is a concave mirror.

6. The projection optical system according to claim 1, wherein the second reflecting surface is a flat mirror.

7. The projection optical system according to claim 1, wherein the plurality of lenses include a lens that has positive power and is formed from low dispersion glass, and the lens formed from the low dispersion glass is bonded to a lens having negative power.

8. The projection optical system according to claim 7, wherein the lens formed from the low dispersion glass has strongest positive power among the plurality of lenses, and both sides of the lens formed from the low dispersion glass are bonded to lenses having negative power, respectively.

9. An image projection device comprising:
the projection optical system according to claim 1; and
the image display element.

10. An image projection system comprising:
the image projection device according to claim 9; and
the projection target surface.

11. The image projection system according to claim 10, wherein the projection target surface has a curvature.

12. A projection optical system for projecting an image in an image display element on a projection target surface in an enlarged manner, the projection optical system comprising:

a transmissive optical system including a plurality of lenses and an aperture diaphragm; and a reflection optical system including a first reflecting surface that reflects light emitted from the transmissive optical system and a second reflecting surface that reflects light emitted from the first reflecting surface, wherein:

the projection target surface is not parallel to a display surface of the image display element, reference rays are rays projected on a position closest to the projection optical system in the image projected on the projection target surface, a principal ray of the reference rays is a ray passing through a center of the aperture diaphragm among the reference rays, local power of the first reflecting surface at a position where the principal ray of the reference rays enters the first reflecting surface is larger than local power of the second reflecting surface at a position where the principal ray of the reference rays enters the second reflecting surface, the projection optical system satisfies conditional expressions (1) and (2) shown below, $$1.0 < \theta scn/\theta m2 < 50.0 \quad (1)$$

$$3.0 < D1/D2 < 15.0 \quad (2)$$

where θscn is an angle formed by a normal line of the projection target surface at a position where the principal ray of the reference rays enters the projection target surface, and the principal ray of the reference rays, θm2 is an angle formed by a normal line of the second reflecting surface at a position where the principal ray of the reference rays enters the second reflecting surface, and the principal ray of the reference rays, D1 is an optical path length of the principal ray of the reference rays extending from a display surface of the image display element to the first reflecting surface, and D2 is an optical path length of the principal ray of the reference rays extending from the first reflecting surface to the second reflecting surface, and the projection optical system satisfies a conditional expression (3) shown below, $$\theta m2 < \theta m1 \quad (3)$$

where $\theta m1$ is an angle formed by a normal line of the first reflecting surface at a position where the principal ray of the reference rays enters the first reflecting surface, and the principal ray of the reference rays.

13. An image projection device comprising:
the projection optical system according to claim 12; and the image display element.

14. An image projection system comprising:
the image projection device according to claim 13; and the projection target surface.

15. A projection optical system for projecting an image in an image display element on a projection target surface in an enlarged manner, the projection optical system comprising:
a transmissive optical system including a plurality of lenses and an aperture diaphragm; and
a reflection optical system including a first reflecting surface that reflects light emitted from the transmissive optical system and a second reflecting surface that reflects light emitted from the first reflecting surface, wherein:
the projection target surface is not parallel to a display surface of the image display element,
reference rays are rays projected on a position closest to the projection optical system in the image projected on the projection target surface,
a principal ray of the reference rays is a ray passing through a center of the aperture diaphragm among the reference rays,
local power of the first reflecting surface at a position where the principal ray of the reference rays enters the first reflecting surface is larger than local power of the second reflecting surface at a position where the principal ray of the reference rays enters the second reflecting surface,
the projection optical system satisfies conditional expressions (1) and (2) shown below, $$1.0 < \theta scn/\theta m2 < 50.0 \quad (1)$$

$$3.0 < D1/D2 < 15.0 \quad (2)$$

where $\theta scn$ is an angle formed by a normal line of the projection target surface at a position where the principal ray of the reference rays enters the projection target surface, and the principal ray of the reference rays, $\theta m2$ is an angle formed by a normal line of the second reflecting surface at a position where the principal ray of the reference rays enters the second reflecting surface, and the principal ray of the reference rays, D1 is an optical path length of the principal ray of the reference rays extending from a display surface of the image display element to the first reflecting surface, and D2 is an optical path length of the principal ray of the reference rays extending from the first reflecting surface to the second reflecting surface, and
the projection optical system satisfies a conditional expression (4) shown below:

$$0.5 < \theta scn/\theta m1 < 5.0 \quad (4),$$

where $\theta m1$ is an angle formed by a normal line of the first reflecting surface at a position where the principal ray of the reference rays enters the first reflecting surface, and the principal ray of the reference rays.

16. An image projection device comprising:
the projection optical system according to claim 15; and the image display element.

17. An image projection system comprising:
the image projection device according to claim 16; and the projection target surface.

18. A projection optical system for projecting an image in an image display element on a projection target surface in an enlarged manner, the projection optical system comprising:
a transmissive optical system including a plurality of lenses and an aperture diaphragm; and
a reflection optical system including a first reflecting surface that reflects light emitted from the transmissive optical system and a second reflecting surface that reflects light emitted from the first reflecting surface, wherein:
the projection target surface is not parallel to a display surface of the image display element,
reference rays are rays projected on a position closest to the projection optical system in the image projected on the projection target surface,
a principal ray of the reference rays is a ray passing through a center of the aperture diaphragm among the reference rays,
local power of the first reflecting surface at a position where the principal ray of the reference rays enters the first reflecting surface is larger than local power of the second reflecting surface at a position where the principal ray of the reference rays enters the second reflecting surface,
the projection optical system satisfies conditional expressions (1) and (2) shown below, $$1.0 < \theta scn/\theta m2 < 50.0 \quad (1)$$

$$3.0 < D1/D2 < 15.0 \quad (2)$$

where $\theta scn$ is an angle formed by a normal line of the projection target surface at a position where the principal ray of the reference rays enters the projection target surface, and the principal ray of the reference rays, $\theta m2$ is an angle formed by a normal line of the second reflecting surface at a position where the principal ray of the reference rays enters the second reflecting surface, and the principal ray of the reference rays, D1 is an optical path length of the principal ray of the reference rays extending from a display surface of the image display element to the first reflecting surface, and D2 is an optical path length of the principal ray of the reference rays extending from the first reflecting surface to the second reflecting surface, and
the projection optical system satisfies a conditional expression (5) shown below:

$$0 < \theta scn + \theta m2 < 150 \quad (5).$$

19. An image projection device comprising:
the projection optical system according to claim 18; and the image display element.

20. An image projection system comprising:
the image projection device according to claim 19; and the projection target surface.

* * * * *